United States Patent
Cheng et al.

(10) Patent No.: US 12,245,218 B2
(45) Date of Patent: Mar. 4, 2025

(54) COMMUNICATION APPARATUS, BASE STATION APPARATUS, AND COMMUNICATION SYSTEM

(71) Applicant: FUJITSU LIMITED, Kawasaki (JP)

(72) Inventors: Huiting Cheng, Yokohama (JP); Jianming Wu, Kawasaki (JP); Tsuyoshi Shimomura, Yokohama (JP); Hongyang Chen, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/204,337

(22) Filed: Mar. 17, 2021

(65) Prior Publication Data

US 2021/0298044 A1  Sep. 23, 2021

Related U.S. Application Data

(63) Continuation of application No. PCT/JP2018/034662, filed on Sep. 19, 2018.

(51) Int. Cl.
*H04W 72/1263* (2023.01)
*H04W 72/50* (2023.01)

(52) U.S. Cl.
CPC ..... *H04W 72/1263* (2013.01); *H04W 72/535* (2023.01)

(58) Field of Classification Search
CPC ..... H04W 76/14; H04W 8/005; H04W 92/18; H04W 4/40; H04W 72/02; H04W 72/0446
See application file for complete search history.

(56) References Cited

U.S. PATENT DOCUMENTS

| | | | |
|---|---|---|---|
| 10,009,876 B2 * | 6/2018 | Huschke | H04W 28/0864 |
| 11,240,783 B2 * | 2/2022 | Lee | H04W 52/346 |
| 11,265,764 B2 * | 3/2022 | Tang | H04W 4/40 |
| 2017/0188375 A1 | 6/2017 | Seo et al. | |
| 2017/0251510 A1 * | 8/2017 | Kitagawa | H04W 72/0453 |

(Continued)

FOREIGN PATENT DOCUMENTS

| | | |
|---|---|---|
| JP | 2017-525169 A | 8/2017 |
| WO | 2015/143170 A1 | 9/2015 |

(Continued)

OTHER PUBLICATIONS

3GPP TS 22.186 V15.2.0, "3rd Generation Partnership Project; Technical Specification Group Services and System Aspects; Enhancement of 3GPP support for V2X scenarios; Stage 1 (Release 15)", Sep. 2017.

(Continued)

*Primary Examiner* — Redentor Pasia
(74) *Attorney, Agent, or Firm* — Myers Wolin, LLC

(57) ABSTRACT

A communication apparatus that supports sidelink communication, the communication apparatus includes, a scheduler configured to select one resource pool from a plurality of resource pools based on a selection criterion set for an individual one of the plurality of resource pools and information regarding sidelink communication, and a transmission unit configured to transmit control information and data by using a resource included in the resource pool selected by the scheduler, wherein the information regarding sidelink communication is a QoS (Quality of Service) condition requested when the data is transmitted via sidelink communication.

20 Claims, 19 Drawing Sheets

COMMUNICATION SYSTEM 10

(56) References Cited

U.S. PATENT DOCUMENTS

| | | |
|---|---|---|
| 2018/0213549 A1* | 7/2018 | Kim .................. H04W 72/1268 |
| 2018/0255563 A1 | 9/2018 | Chen et al. |
| 2019/0014565 A1 | 1/2019 | Fujishiro et al. |
| 2019/0021019 A1* | 1/2019 | Seo .................. H04W 72/1263 |
| 2019/0090250 A1* | 3/2019 | Lee ..................... H04W 72/02 |
| 2019/0132838 A1* | 5/2019 | Yi ..................... H04L 5/0007 |
| 2019/0182840 A1* | 6/2019 | Feng ..................... H04W 4/44 |
| 2019/0208441 A1* | 7/2019 | Wang .................. H04W 24/10 |
| 2019/0229964 A1* | 7/2019 | Ouchi .................. H04L 5/0051 |
| 2019/0238300 A1* | 8/2019 | Tang ..................... H04L 5/0007 |
| 2020/0029340 A1* | 1/2020 | He ..................... H04W 76/14 |
| 2020/0170001 A1* | 5/2020 | Li ..................... H04W 72/0446 |
| 2020/0229029 A1* | 7/2020 | Yasukawa ............. H04W 28/04 |
| 2020/0252922 A1 | 8/2020 | Fujishiro et al. |
| 2020/0280961 A1* | 9/2020 | Lee ..................... H04W 4/40 |
| 2020/0296738 A1* | 9/2020 | Inokuchi ............... H04W 72/21 |
| 2020/0367113 A1* | 11/2020 | Tang ..................... H04W 4/40 |
| 2020/0396791 A1* | 12/2020 | Kim ..................... H04W 76/23 |
| 2021/0160817 A1* | 5/2021 | Khoryaev ............ H04W 72/542 |
| 2021/0329596 A1* | 10/2021 | Freda ..................... H04W 72/56 |

FOREIGN PATENT DOCUMENTS

| | | |
|---|---|---|
| WO | 2017/077625 A1 | 5/2017 |
| WO | 2017/145867 A1 | 8/2017 |
| WO | 2018/081979 A1 | 5/2018 |

OTHER PUBLICATIONS

3GPP TS 36.211 V15.1.0, "3rd Generation Partnership Project; Technical Specification Group Radio Access Network; Evolved Universal Terrestrial Radio Access (E-UTRA); Physical channels and modulation (Release 15)", Mar. 2018.
3GPP TS 36.212 V15.1.0, "3rd Generation Partnership Project; Technical Specification Group Radio Access Network; Evolved Universal Terrestrial Radio Access (E-UTRA); Multiplexing and channel coding (Release 15)", Mar. 2018.
3GPP TS 36.213 V15.1.0, "3rd Generation Partnership Project; Technical Specification Group Radio Access Network; Evolved Universal Terrestrial Radio Access (E-UTRA); Physical layer procedures (Release 15)", Mar. 2018.
3GPP TS 36.300 V15.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Mar. 2018.
3GPP TS 36.321 V15.1.0, "3rd Generation Partnership Project; Technical Specification Group Radio Access Network; Evolved Universal Terrestrial Radio Access (E-UTRA); Medium Access Control (MAC) protocol specification (Release 15)", Mar. 2018.
3GPP TS 36.322 V15.0.1, "3rd Generation Partnership Project; Technical Specification Group Radio Access Network; Evolved Universal Terrestrial Radio Access (E-UTRA); Radio Link Control (RLC) protocol specification (Release 15)", Apr. 2018.
3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.
3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018.
3GPP TS 36.413 V15.1.0, "3rd Generation Partnership Project; Technical Specification Group Radio Access Network; Evolved Universal Terrestrial Radio Access Network (E-UTRAN); S1 Application Protocol (S1AP) (Release 15)", Mar. 2018.
3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)", Mar. 2018.
3GPP TS 36.425 V14.1.0, "3rd Generation Partnership Project; Technical Specification Group Radio Access Network; Evolved Universal Terrestrial Radio Access Network (E-UTRAN); X2 interface user plane protocol (Release 14)", Mar. 2018.
3GPP TS 37.340 V15.1.0, "3rd Generation Partnership Project; Technical Specification Group Radio Access Network; Evolved Universal Terrestrial Radio Access (E-UTRA) and NR; Multi-connectivity; Stage 2 (Release 15)", Mar. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.1.0, "3rd Generation Partnership Project; Technical Specification Group Radio Access Network; NR; Services provided by the physical layer (Release 15)", Mar. 2018.
3GPP TS 38.211 V15.1.0, "3rd Generation Partnership Project; Technical Specification Group Radio Access Network; NR; Physical channels and modulation (Release 15)", Mar. 2018.
3GPP TS 38.212 V15.1.1, 3rd Generation Partnership Project; Technical Specification Group Radio Access Network; NR; Multiplexing and channel coding (Release 15), Apr. 2018.
3GPP TS 38.213 V15.1.0, "3rd Generation Partnership Project; Technical Specification Group Radio Access Network; NR; Physical layer procedures for control (Release 15)", Mar. 2018.
3GPP TS 38.214 V15.1.0, "3rd Generation Partnership Project; Technical Specification Group Radio Access Network; NR; Physical layer procedures for data (Release 15)", Mar. 2018.
3GPP TS 38.215 V15.1.0, "3rd Generation Partnership Project; Technical Specification Group Radio Access Network; NR; Physical layer measurements (Release 15)", Mar. 2018.
3GPP TS 38.300 V15.1.0, "3rd Generation Partnership Project; Technical Specification Group Radio Access Network; NR; NR and NG-RAN Overall Description; Stage 2 (Release 15)", Mar. 2018.
3GPP TS 38.321 V15.1.0, "3rd Generation Partnership Project; Technical Specification Group Radio Access Network; NR; Medium Access Control (MAC) protocol specification (Release 15)", Mar. 2018.
3GPP TS 38.322 V15.1.0, "3rd Generation Partnership Project; Technical Specification Group Radio Access Network; NR; Radio Link Control (RLC) protocol specification (Release 15)", Mar. 2018.
3GPP TS 38.323 V15.1.0, "3rd Generation Partnership Project; Technical Specification Group Radio Access Network; NR; Packet Data Convergence Protocol (PDCP) specification (Release 15)", Mar. 2018.
3GPP TS 38.331 V15.1.0, "3rd Generation Partnership Project; Technical Specification Group Radio Access Network; NR; Radio Resource Control (RRC) protocol specification (Release 15)", Mar. 2018.
3GPP TS 38.401 V15.1.0, "3rd Generation Partnership Project; Technical Specification Group Radio Access Network; NG-RAN; Architecture description (Release 15)", Mar. 2018.
3GPP TS 38.410 V0.9.0, "3rd Generation Partnership Project; Technical Specification Group Radio Access Network; NG-RAN; NG general aspect and principles (Release 15)", Apr. 2018.
3GPP TS 38.413 V0.8.0, "3rd Generation Partnership Project; Technical Specification Group Radio Access Network; NG-RAN; NG Application Protocol (NGAP) (Release 15)", Apr. 2018.
3GPP TS 38.420 V0.8.0, "3rd Generation Partnership Project; Technical Specification Group Radio Access Network; NG-RAN; Xn general aspects and principles (Release 15)", Apr. 2018.
3GPP TS 38.423 V0.8.0, "3rd Generation Partnership Project; Technical Specification Group Radio Access Network; NG-RAN; Xn application protocol (XnAP) (Release 15)", Apr. 2018.
3GPP TS 38.470 V15.1.0, "3rd Generation Partnership Project; Technical Specification Group Radio Access Network; NG-RAN; F1 general aspects and principles (Release 15)", Mar. 2018.
3GPP TS 38.473 V15.1.1, "3rd Generation Partnership Project; Technical Specification Group Radio Access Network; NG-RAN; F1 application protocol (F1AP) (Release 15)", Apr. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.

(56) References Cited

OTHER PUBLICATIONS

3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHZ (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
Qualcomm Incorporated, "Resource pool sharing between Mode 3 and Mode 4", Agenda Item: 6.2.3.4, 3GPP TSG-RAN WG1 Meeting #91, R1-1720412, Reno, USA, Nov. 27-Dec. 1, 2017.
Fujitsu, "Resource Allocation for NR V2X Sidelink Communication considering low latency requirement", Agenda Item: 7.2.4.1.4, 3GPP TSG-RAN WG1 Meeting #94, R1-1808297, Gothenburg, Sweden, Aug. 20-24, 2018.
International Search Report and Written Opinion of the International Searching Authority by the Japan Patent Office for corresponding International Patent Application No. PCT/JP2018/034662, mailed on Dec. 11, 2018, with an English translation.
Extended European search report with the supplementary European search report and the European search opinion issued by the European Patent Office for corresponding European patent application No. 18934068.0-1212 mailed on Aug. 11, 2021.
Intel Corporation, "Sidelink Resource Pool Sharing for eNB-Controlled and UE-Autonomous V2V Transmission Modes", Agenda Item 6.2.5.4, 3GPP TSG RAN WG1 Meeting #92bis, R1-1804690, Sanya, China, Apr. 16-20, 2018.
Lenovo et al, "Discussion on latency reduction for V2X", Agenda Item 7.2.3.1.2, 3GPP TSG RAN WG1 Meeting #91, R1-1719751, Reno, USA, Nov. 27-Dec. 1, 2017.
Notice of Reasons for Refusal issued by the Japan Patent office for corresponding Japanese Patent Application No. 2020-547517, mailed on Apr. 12, 2022, with an English machine translation.
First Notification of Office Action and Search Report issued by the China National Intellectual Property Administration for corresponding Chinese Patent Application No. 201880097765.8, mailed on May 20, 2023, with an English translation.
Second Notification of Office Action and Search Report issued by the China National Intellectual Property Administration for corresponding Chinese Patent Application No. 201880097765.8, mailed on Jan. 21, 2024, with an English translation.

* cited by examiner

FIG. 6

| Selection priority / QoS requirement | Priority 1 | Priority 2 | ... |
|---|---|---|---|
| QoS0: (3ms latency $10^{-5}$ reliability) | Resource pool $k$-1 | resource pool k | - |
| QoS1: (10ms latency $10^{-4}$ reliability) | Resource pool $k$ | Resource pool k-1 | - |
| ... | ... | ... | .. |

113-c

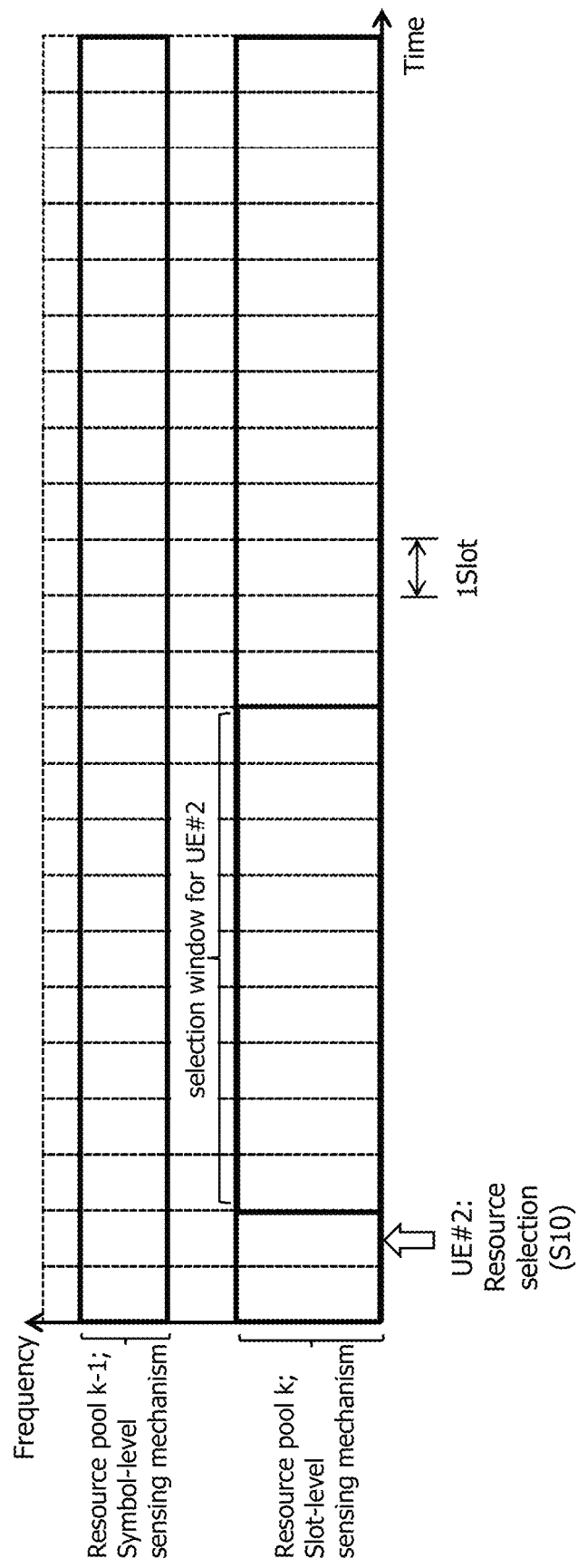

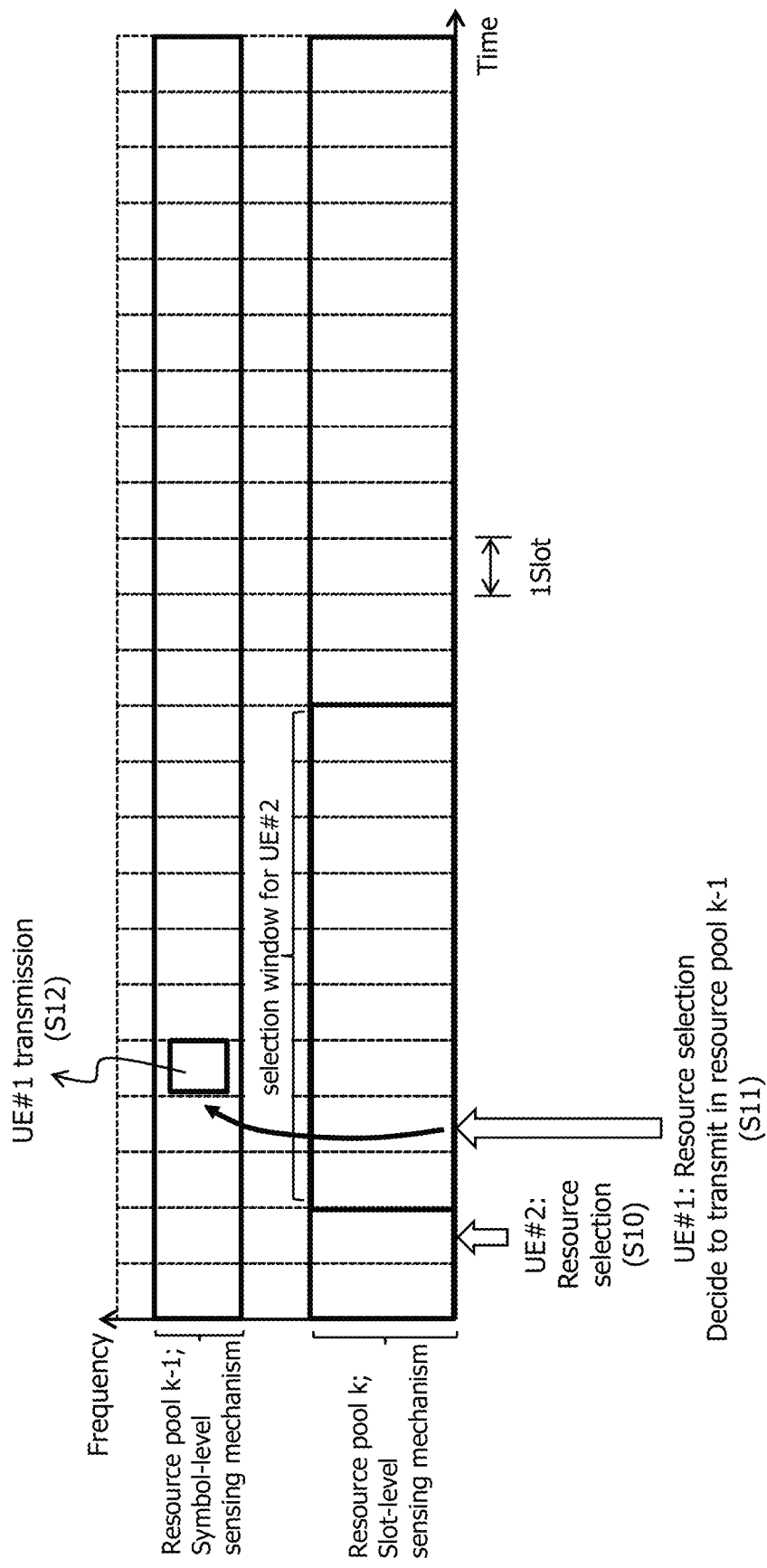

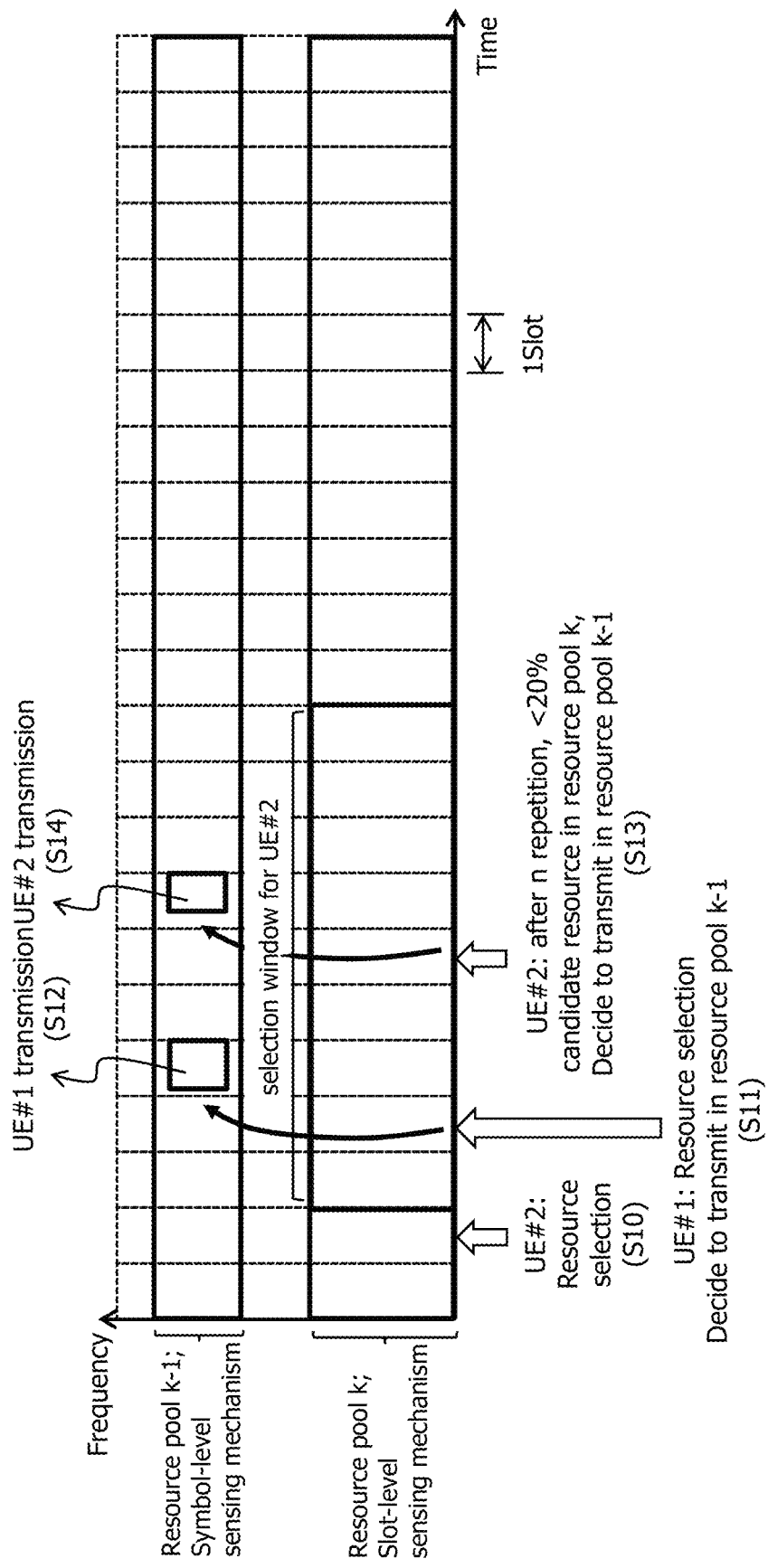

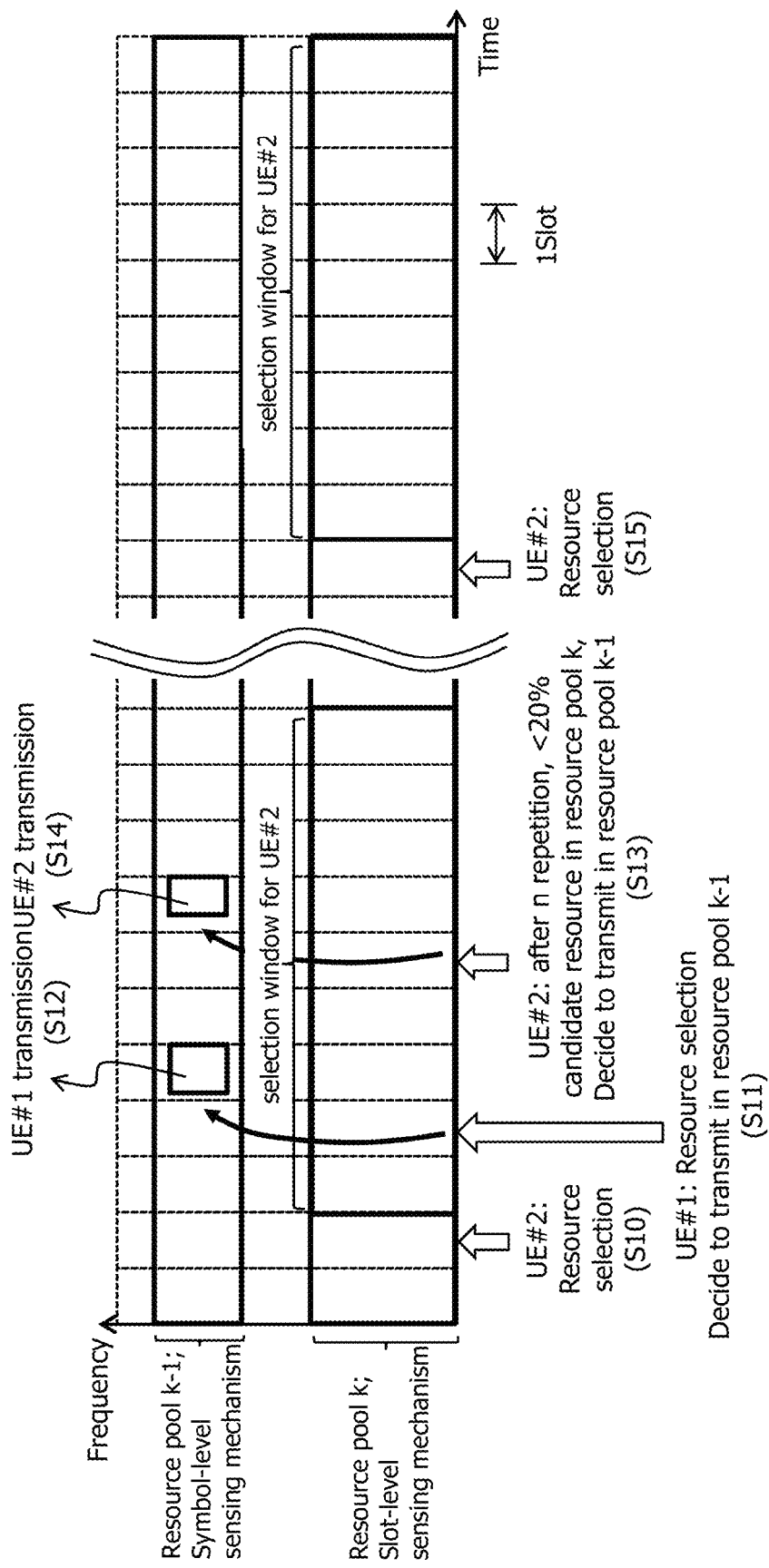

FIG. 15

| Selection priority / QoS requirement | Priority 1 | Priority 2 | ... |
|---|---|---|---|
| QoS0: (3ms latency $10^{-5}$ reliability) | Resource pool $k$-1, resource pool $k$ | - | - |
| QoS1: (10ms latency $10^{-4}$ reliability) | Resource pool $k$ | Resource pool $k$-1 | - |
| ... | ... | ... | .. |

113-c

COMMUNICATION APPARATUS, BASE STATION APPARATUS, AND COMMUNICATION SYSTEM

CROSS-REFERENCE TO RELATED APPLICATION

This application is a continuation application of International Application Number PCT/JP2018/034662 filed on Sep. 19, 2018 and designated the U.S., the entire contents of which are incorporated herein by reference.

FIELD

The present invention relates to a communication apparatus, a base station apparatus, and a communication system.

BACKGROUND

The traffic of mobile terminals (smartphones and feature phones) occupies most of the network resources in current networks. In addition, the traffic used by mobile terminals is expected to expand further in the future.

Meanwhile, with the development of Internet of Things (IoT) services (for example, transportation systems, smart meters, monitoring systems for devices, etc.), there has been a demand for supporting services with various requirements. This leads to a demand for technologies that realize higher data rates, larger capacities, and lower delays to be provided in communication standards of the 5th generation mobile communications (5G or New Radio (NR)), in addition to standard technologies (for example, Non-Patent Literature 2 to 12) of the 4th generation mobile communications (4G).

Technical studies on the 5th generation communication standards are in progress in the working groups (for example, TSG-RAN WG1, TSG-RAN WG2, etc.) of the Third Generation Partnership Project (3GPP) (Non-Patent Literature 13 to 40).

As described above, to support a wide variety of services, 5G is intended to support many use cases that are classified into Enhanced Mobile Broad Band (eMBB), Massive Machine Type Communications (MTC), and Ultra-Reliable and Low Latency Communication (URLLC).

The 3GPP working groups are also discussing Device to Device (D2D) communication. D2D communication is also called sidelink communication. As an example of D2D communication, Vehicle to Everything (V2X) communication is also being studied. V2X is a general term for communication using a sidelink channel, such as Vehicle to Vehicle (V2V) indicating communication between vehicles, Vehicle to Pedestrian (V2P) indicating communication between a vehicle and a pedestrian, and Vehicle to Infrastructure (V2I) indicating communication between a vehicle and a road infrastructure such as a road sign. Specifications of V2X are described in, for example, Non-Patent Literature 1.

FIG. 17 illustrates an example of resource allocation of V2X. The example in FIG. 17 illustrates resource allocation of a case where a Physical Sidelink Control CHannel (PSCCH), which is a control channel, and a PSSCH, which is a data channel, are allocated adjacent to each other. In FIG. 17, the horizontal axis represents the time axis direction, and the vertical axis represents the frequency axis direction. The example illustrated in FIG. 17 includes four subchannels in the frequency axis direction. A PSCCH including two Resource Blocks (RBs) and a PSSCH including m (m is an integer of 3 or more) RBs are allocated adjacent to each other in each subchannel. As illustrated in FIG. 17, a PSCCH resource represented by the diagonal lines and a PSSCH resource represented by the horizontal lines are used for actual transmission. Sidelink Control Information (SCI) including information such as a modulation method and a coding rate of corresponding PSSCH data is mapped to the PSCCH resource.

FIG. 18 also illustrates an example of resource allocation of V2X. The example in FIG. 18 illustrates resource allocation of a case where a PSCCH and a PSSCH are not allocated adjacent to each other. In FIG. 18, too, a PSCCH resource represented by the diagonal lines and a PSSCH resource represented by the horizontal lines are used for actual transmission. As illustrated in FIG. 18, the PSCCH and PSSCH resources are not adjacent to each other. SCI about the corresponding PSSCH is mapped to the PSCCH resource.

Examples of the resource allocation method for V2X in 4G include a centralized resource allocation method (In-coverage RRC_CONNECTED UEs) and a distributed resource allocation method (In-coverage RRC_IDLE UEs or out-of-coverage UEs).

The centralized allocation method is applicable when a terminal apparatus that implements V2X is within the coverage of a mobile communication system and is also called mode 3. The distributed resource allocation method is applicable even when a terminal apparatus is not within the coverage of a mobile communication system and is also called mode 4. In mode 4, no communication is performed between the terminal apparatus and the mobile communication system for resource allocation so that a transmission delay that occurs after transmission data is generated by the terminal apparatus is shortened, and a strict delay requirement can be satisfied.

In mode 4, each terminal apparatus senses the frequency band used for V2X when transmission data is generated, excludes resources that are likely to be used by other terminal apparatuses based on the sensing result, and selects the resource to be used for transmitting the data.

FIG. 19 illustrates an example of resource selection. As illustrated in FIG. 19, when transmission data is generated at time T, a terminal apparatus (or User Equipment (UE)) #3 sets a selection window with a time width of [T+T1, T+T2]. Here, T1≤4, 10≤T2≤100, and specific numerical values of T1 and T2 are determined by the implementation of the terminal. UE #3 then excludes resources from the selection window based on control information in the PSCCH in a sensing window having a time width of 1000 ms up to time T and an energy measurement of the corresponding PSSCH. The step of excluding resources as described above may be referred to as a resource exclusion step.

In this case, when more than 80% of all the resources in the selection window is excluded, UE #3 sets a threshold higher than the threshold currently set (for example, "3 dB" higher) to relax (or loosen) the exclusion condition. Next, UE #3 uses the increased threshold to perform the resource exclusion step again and repeats the resource exclusion step until the candidate resources remaining without being excluded are 20% or more of all the resources in the selection window. After performing the resource exclusion step, UE #3 further narrows down the remaining candidate resources to 20% or more of all the resources in ascending order of average receiving power and randomly selects one resource therefrom.

In FIG. 19, for example, UE #3 excludes the resources of UE #1 and UE #2 in the selection window. UE #3 then narrows down the candidate resources that are not excluded in the selection window in ascending order of the average receiving power. UE #3 selects any one of 20% or more of all the remaining resources and uses the selected resource to transmit control information and data.

There are known, for example, the following technique related to wireless communication. That is, there is known a wireless terminal that selects a control information resource from a first control information resource pool to transmit priority data and selects a control information resource from a second control information resource pool to transmit non-priority data.

According to this technique, a wireless communication system that supports D2D communication can avoid or reduce failure in priority data communication.

There is also known a wireless terminal that uses any one of a plurality of resource pools provided for each communication service based on resource map information indicating allocation pattern of the plurality of resource pools.

According to this technique, various services can be provided in a single wireless resource format.

CITATION LIST
NON-PATENT LITERATURE

NPL 1: 3GPP TS 22.186 V15.2.0(2017 September)
NPL 2: 3GPP TS 36.211 V15.1.0(2018 March)
NPL 3: 3GPP TS 36.212 V15.1.0(2018 March)
NPL 4: 3GPP TS 36.213 V15.1.0(2018 March)
NPL 5: 3GPP TS 36.300 V15.1.0(2018 March)
NPL 6: 3GPP TS 36.321 V15.1.0(2018 March)
NPL 7: 3GPP TS 36.322 V15.0.1(2018 April)
NPL 8: 3GPP TS 36.323 V14.5.0(2017 December)
NPL 9: 3GPP TS 36.331 V15.1.0(2018 March)
NPL 10: 3GPP TS 36.413 V15.1.0(2018 March)
NPL 11: 3GPP TS 36.423 V15.1.0(2018 March)
NPL 12: 3GPP TS 36.425 V14.1.0(2018 March)
NPL 13: 3GPP TS 37.340 V15.1.0(2018 March)
NPL 14: 3GPP TS 38.201 V15.0.0(2017 December)
NPL 15: 3GPP TS 38.202 V15.1.0(2018 March)
NPL 16: 3GPP TS 38.211 V15.1.0(2018 March)
NPL 17: 3GPP TS 38.212 V15.1.1(2018 April)
NPL 18: 3GPP TS 38.213 V15.1.0(2018 Mar. 12)
NPL 19: 3GPP TS 38.214 V15.1.0(2018 March)
NPL 20: 3GPP TS 38.215 V15.1.0(2018 March)
NPL 21: 3GPP TS 38.300 V15.1.0(2018 March)
NPL 22: 3GPP TS 38.321 V15.1.0(2018 March)
NPL 23: 3GPP TS 38.322 V15.1.0(2018 March)
NPL 24: 3GPP TS 38.323 V15.1.0(2018 March)
NPL 25: 3GPP TS 38.331 V15.1.0(2018 March)
NPL 26: 3GPP TS 38.401 V15.1.0(2018 March)
NPL 27: 3GPP TS 38.410 V0.9.0(2018 April)
NPL 28: 3GPP TS 38.413 V0.8.0(2018 April)
NPL 29: 3GPP TS 38.420 V0.8.0(2018 April)
NPL 30: 3GPP TS 38.423 V0.8.0(2018 April)
NPL 31: 3GPP TS 38.470 V15.1.0(2018 March)
NPL 32: 3GPP TS 38.473 V15.1.1(2018 April)
NPL 33: 3GPP TR 38.801 V14.0.0(2017 April)
NPL 34: 3GPP TR 38.802 V14.2.0(2017 September)
NPL 35: 3GPP TR 38.803 V14.2.0(2017 September)
NPL 36: 3GPP TR 38.804 V14.0.0(2017 March)
NPL 37: 3GPP TR 38.900 V14.3.1(2017 July)
NPL 38: 3GPP TR 38.912 V14.1.0(2017 June)
NPL 39: 3GPP TR 38.913 V14.3.0(2017 June)
NPL 40: 3GPP TSG RAN #91, R1-1720412, "Resource pool sharing between Mode 3 and Mode4", Reno, USA November 27th-Dec. 1st, 2017

PATENT LITERATURE

Patent Literature 1: WO 2017/077625
Patent Literature 2: WO 2017/145867

As described in the above Non-Patent Literature 1, a very high level of communication delay and reliability is needed for V2X communication in 5G.

In mode 4, for example, as illustrated in FIG. 19, the selection window has a minimum size of 10 ms. In this case, a delay of 10 ms may be generated by the terminal apparatus between the start of resource selection and the data transmission. With this level of delay of 10 ms, there is a case where the communication delay needed by 5G is not satisfied.

In mode 4, for example, when the candidate resources remaining without being excluded in the selection window after the resource exclusion step are 20% or more of all the resources in the selection window, the terminal apparatus can select a resource. However, when the available resources are 20%, 80% of the resources are used by other terminal apparatuses may be included in the set of candidate resources. When the terminal apparatus selects a candidate resource and transmits a signal to a different terminal apparatus, a signal transmitted from the different terminal apparatus may become an interference source. Packet data may collide due to the occurrence of interference. If the remaining candidate resources are only about 20%, there is a case where the communication reliability needed by 5G is not satisfied.

Furthermore, the above-mentioned technique, in which a control information resource is selected from a different control information resource pool for transmission of priority data and for transmission of non-priority data, provides no solution to the issue on communication delay and reliability.

Likewise, the above-mentioned technique, in which any one of a plurality of resource pools provided for each communication service is used based on the resource map information, provides no solution to the issue on communication delay and reliability.

SUMMARY

A communication apparatus that supports sidelink communication, the communication apparatus includes, a scheduler configured to select one resource pool from a plurality of resource pools based on a selection criterion set for an individual one of the plurality of resource pools and information regarding sidelink communication, and a transmission unit configured to transmit control information and data by using a resource included in the resource pool selected by the scheduler, wherein the information regarding sidelink communication is a QoS (Quality of Service) condition requested when the data is transmitted via sidelink communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a selection criteria table.

FIG. 7 illustrates an example of resource selection.

FIG. 8 illustrates an example of resource selection.

FIG. 10 illustrates an example of resource selection.

FIG. 11 illustrates an example of resource selection.

FIG. 15 illustrates an example of a selection criteria table.

DESCRIPTION OF EMBODIMENTS

Embodiments will be described in detail below with reference to the figures. The problems and embodiments described in this description are examples and do not limit the scope of rights of this application. More specifically, even when different expressions are used in the description, as long as the expressions are technically equivalent, the technology of the present application can be applied even to these different expressions, and the scope of rights is not limited thereby. Moreover, the embodiments can be combined as appropriate within a scope that does not contradict the processing content.

In addition, terms and technical contents described in specifications and contributions as standards related to communication such as the 3GPP may appropriately be used for the terms and technical contents described in the present description. Examples of such specifications include 3GPP TS38.211 V15.1.0 (2018-03).

The 3GPP specifications are updated as needed. Therefore, the latest specifications at the time of filing the present application may be used as the specifications described above. Further, the terms and technical contents described in the latest specifications may appropriately be used in the present description.

Hereinafter, examples of a terminal apparatus, a base station apparatus, and a communication system disclosed in the present application will be described in detail with reference to the drawings. The following embodiments do not limit the disclosed technique.

First Embodiment

<1. Configuration Example of Wireless Communication System>

Figure 1:
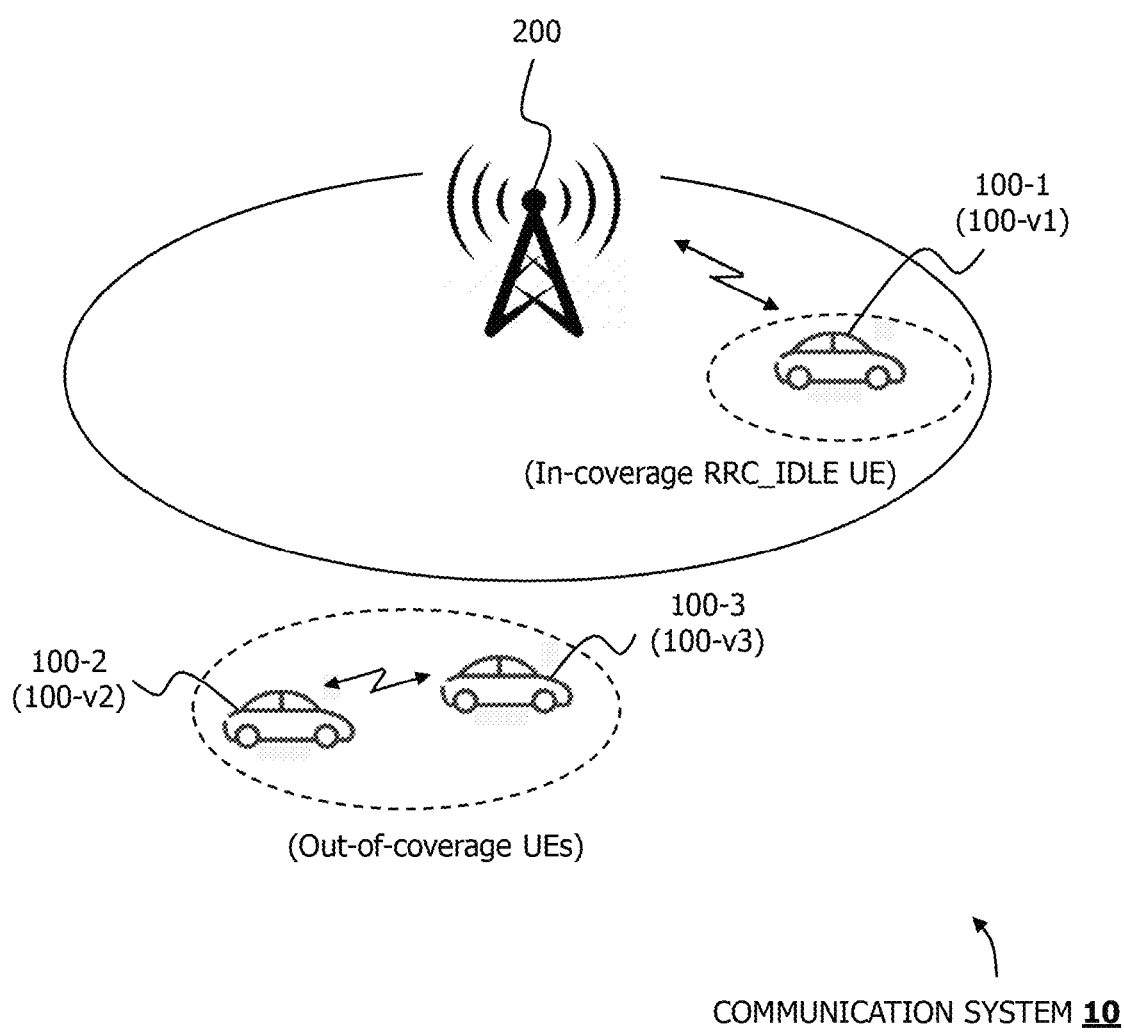
FIG. 1 illustrates a configuration example of a communication system.

FIG. 1 illustrates a configuration example of a communication system 10 according to a first embodiment.

The communication system 10 includes a plurality of terminal apparatuses (or communication devices, which may hereinafter be referred to as "terminals") 100-2 and 100-3. The communication system 10 may include a base station apparatus (which may hereinafter be referred to as a "base station") 200 and a terminal 100-1. In the latter case, the terminal 100-1 can receive information about a selection criterion, etc. from the base station 200 and use the received information to perform wireless communication with the other terminals 100-2 and 100-3. As with the terminal 100-1, the terminals 100-2 and 100-3 can receive information about a selection criterion within the coverage range of the base station 200.

The terminals 100-1 to 100-3 are, for example, communication devices capable of wireless communication, such as wireless communication chipsets, feature phones, smartphones, personal computers, tablet terminals and game devices.

In addition, the terminals 100-1 to 100-3 can perform wireless communication via V2X communication, for example. As described above, V2X is a general term for V2V, V2P, V2I, or the like. Thus, for example, in FIG. 1, in a case where the terminal 100-2 is provided on a vehicle 100-v2, the terminal 100-3, which is a communication peer, may be held by a pedestrian, rather than a vehicle, or provided on a road sign. However, the following description will be made assuming that the terminals 100-1 to 100-3 are provided on vehicles 100-v1 to 100-v3, respectively. Further, the terminals 100-1 to 100-3 can perform wireless communication via V2X communication in mode 4, for example. As described above, mode 4 is, for example, a method in which the terminals 100-1 to 100-3 can autonomously select resources. In the case of FIG. 1, the terminal 100-1 can perform V2X communication in mode 4 when in a Radio Resource Control (RRC) idle (RRC_IDLE) state and in an RRC connected state within the coverage range of the base station 200. In addition, as illustrated in FIG. 1, the terminals 100-2 and 100-3 can perform V2X communication in mode 4 outside the coverage range of the base station 200.

The RRC idle state is, for example, a standby state in which the terminal 100-1 is not RRC-connected to the network side including the base station 200. The RRC connected state (RRC_CONNECTED) is, for example, a state in which the terminal 100-2 is connected to the network including the base station 200 so that data can be transmitted and received.

The number of terminals 100-2 and 100-3 included in the communication system 10 is not limited to two, but may be three or more.

Unless otherwise specified, the terminals 100-1 to 100-3 may be hereinafter referred to as the terminal 100.

<2. Configuration Example of Terminal Apparatus>

Figure 2:
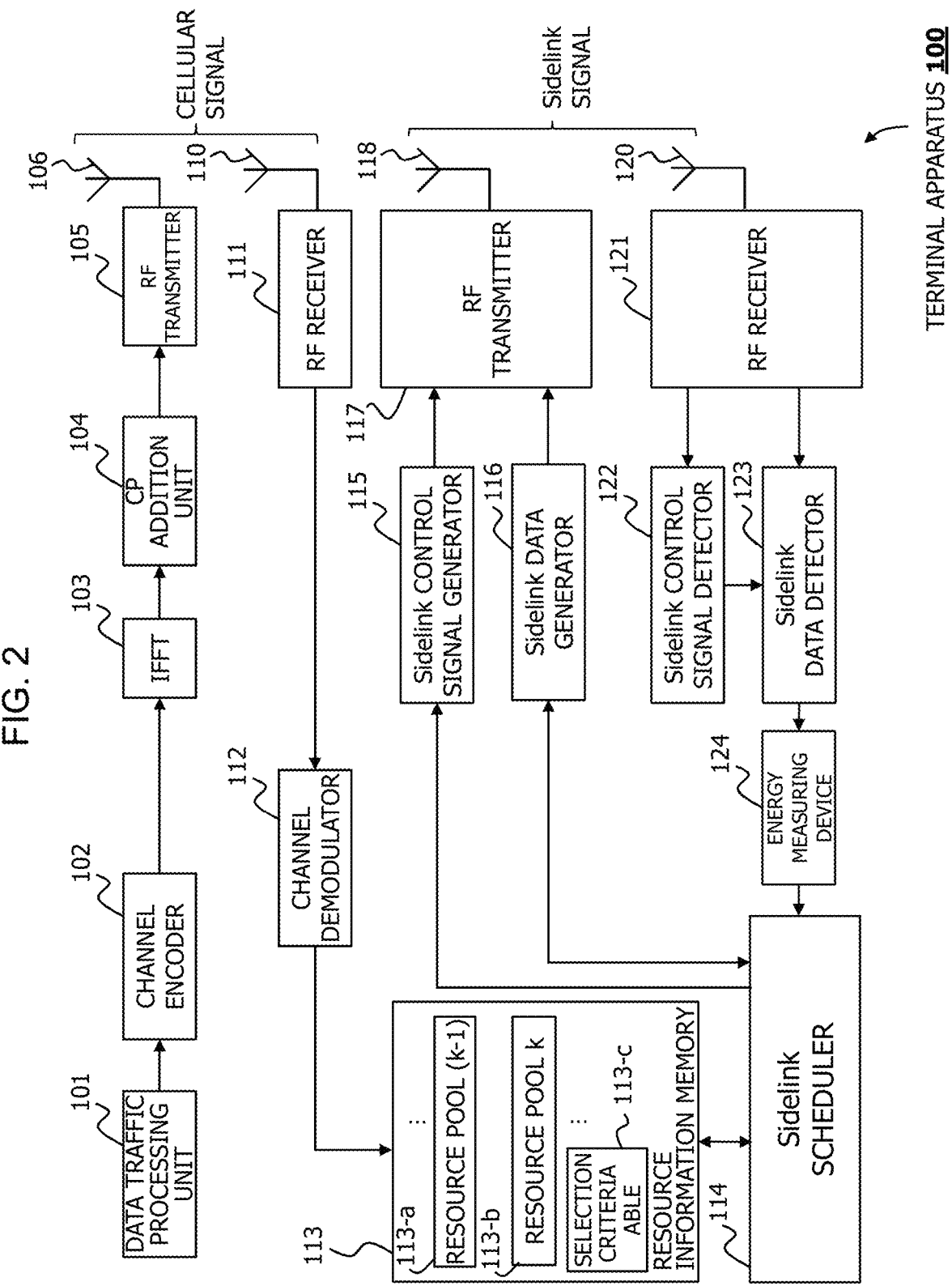
FIG. 2 illustrates a configuration example of a terminal.

FIG. 2 illustrates a configuration example of the terminal 100.

To support cellular signals, the terminal 100 includes a data traffic processing unit 101, a channel encoder 102, an Inverse Fast Fourier transform (IFFT) 103, a Cyclic Prefix (CP) addition unit 104, a Radio Frequency (RF) transmitter 105, and a transmission antenna 106. In addition, to support cellular signals, the terminal 100 includes a reception antenna 110, an RF receiver 111, and a channel demodulator 112.

The data traffic processing unit 101 generates data to be used in cellular communication, such as voice data and image data. The data traffic processing unit 101 outputs the generated data to the channel encoder 102.

The channel encoder 102 performs error correction encoding processing (which may hereinafter be referred to as "encoding processing") and modulation processing, etc. on the data to covert the data into a transmission signal. The channel encoder 102 outputs the converted transmission signal to the IFFT 103.

The IFFT 103 performs an inverse fast Fourier transform on the transmission signal to covert the transmission signal in the frequency domain into a transmission signal in the time domain. The IFFT 103 outputs the transmission signal in the time domain to the CP addition unit 104.

The CP addition unit 104 adds a cyclic prefix (CP) to the transmission signal in the time domain. The CP addition unit 104 outputs the transmission signal, to which the CP is added, to the RF transmitter 105.

The RF transmitter 105 performs Digital-to-Analogue (D/A) conversion processing, frequency conversion processing, etc. on the transmission signal, to which the CP is added, to generate a cellular signal of a radio band. The RF transmitter 105 outputs the cellular signal to the transmission antenna 106.

The transmission antenna 106 transmits the cellular signal to the base station 200.

The reception antenna 110 receives the cellular signal transmitted from the base station 200 and outputs the received cellular signal to the RF receiver 111.

The RF receiver 111 performs frequency conversion processing, Analogue-to-Digital (A/D) conversion processing, etc. on the cellular signal to convert the cellular signal of the radio band into a reception signal of the base band. The RF receiver 111 outputs the reception signal to the channel demodulator 112.

The channel demodulator 112 performs demodulation processing, error correction decoding processing (which may hereinafter be referred to as "decoding processing"), etc. on the reception signal to reproduce (or extract) the data, the control information, or the like. When the channel demodulator 112 has reproduced the information about the resource pool and information about the selection criterion, the channel demodulator 112 stores the reproduced information about the resource pool and information about the selection criterion in a resource information memory 113. Hereinafter, the information about the resource pool and the information about the selection criterion may collectively be referred to as the resource information.

In addition, to support a sidelink signal, the terminal 100 includes the resource information memory 113, a sidelink scheduler (which may hereinafter be referred to as a "scheduler") 114, a signal (PSCCH: Physical Sidelink Control Channel) generator (which may hereinafter be referred to as a "control signal generator") 115 including Sidelink Control Information (SCI). A signal including sidelink control information (SCI) may be referred to as sidelink control signal. Further, to support a sidelink signal, the terminal 100 includes a sidelink data generator (which may hereinafter be referred to as a "data generator") 116, an RF transmitter 117, a transmission antenna 118, a reception antenna 120, and an RF receiver 121. Further, to support a sidelink signal, the terminal 100 includes a sidelink control signal detector (which may hereinafter be referred to as a "control signal detector") 122, a sidelink data detector (which may hereinafter be referred to as a "data detector") 123, and an energy measuring device 124.

The resource information memory 113 stores resource information (information about the resource pool and information about the selection criterion). The information about the resource pool includes information 113-*a* about the resource pool (k−1) and information 113-*b* about the resource pool k.

The information 113-*a* about the resource pool (k−1) includes information indicating the resource range of the resource pool (k−1), namely, the range of the frequency resources and time resources to be used by the resource pool (k−1), for example. The information 113-*b* about the resource pool k includes information indicating the resource range of the resource pool k, namely, the range of the frequency resources and the time resources to be used by the resource pool k, for example.

Figure 5:
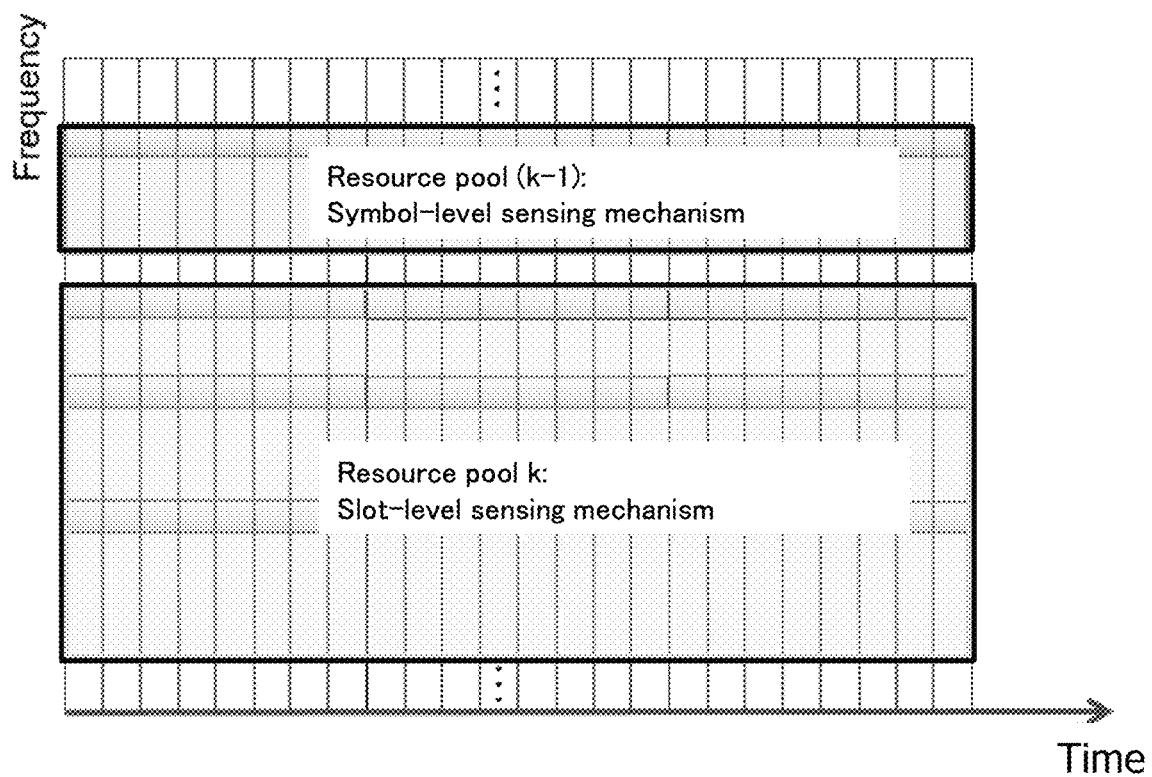
FIG. 5 illustrates an example of resource allocation of a resource pool k and a resource pool (k−1).

When the information 113-*a* about the resource pool (k−1) and the information 113-*b* about the resource pool k are represented on two-dimensional coordinates in which the horizontal axis represents the time axis direction and the vertical axis represents the frequency axis direction, for example, a resource allocation example illustrated in FIG. 5 is obtained. FIG. 5 will be described in detail below.

Returning to FIG. 2, the information about the selection criterion is, for example, information about usage ranking indicating that at least one of the resource pool k and the resource pool (k−1) is preferentially used per Quality of Service (QOS). Namely, the information about the selection criterion includes, for example, QoS and usage ranking. For example, the terminal 100 selects the resource pool k or the resource pool (k−1) in order of the usage ranking based on whether QoS matches the conditions.

For example, FIG. 6 illustrates an example of a selection criteria table 113-*c* in which the information about the selection criteria is summarized in a table format. FIG. 6 will be described in detail below. The selection criteria table 113-*c* is stored in the resource information memory 113.

QoS is, for example, QoS requested when data is transmitted via sidelink communication. QoS is also parameters related to the data or information about sidelink communication. Details of the QoS will be described below.

Returning to FIG. 2, the scheduler 114 performs scheduling related to sidelink communication. Specifically, the scheduler 114 selects the resource pool k or the resource pool (k−1) in accordance with the selection criterion set for each of the resource pool k and resource pool (k−1) and the information about sidelink communication. That is, for example, the scheduler 114 selects at least one resource pool that corresponds to the QoS output from the data generator 116 by using the selection criteria table 113-*c* (for example, FIG. 6). Next, the scheduler 114 performs carrier sense by using a sensing method set for each of the resource pool k and the resource pool (k−1) selected. Hereinafter, "sensing" and "carrier sense" may be used without distinction.

FIG. 5 illustrates an example of resource allocation of the resource pool k and the resource pool (k−1).

Figure 19:
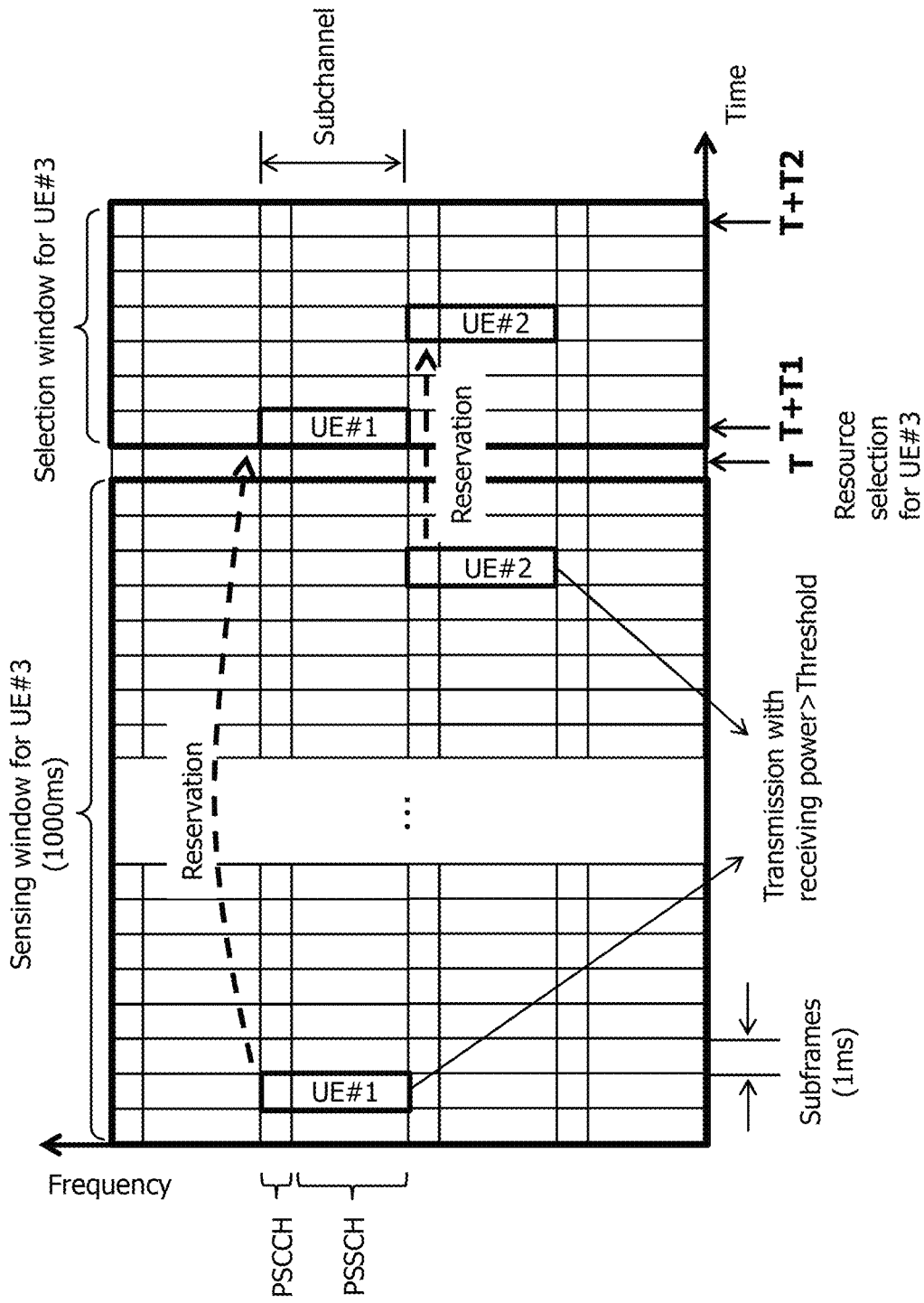
FIG. 19 illustrates an example of resource selection.

The resource pool k is, for example, a resource pool in which slot-level (or subframe) sensing is performed. When using the resource pool k, the scheduler 114 sets a past number ms (for example, 1000 ms) before the resource selection as the sensing window and sets the selection window in the range of 10 ms to 100 ms after the resource selection. The scheduler 114 then performs a resource exclusion step and a resource narrowing step on each resource in the selection window on a slot basis (or on a subframe basis) based on each resource in the sensing window. The resource exclusion step and the resource narrowing step are performed based on a reception energy measurement for the reception signal received using each resource, as described with reference to FIG. 19, for example. Thus, the scheduler 114 performs the resource exclusion step and the resource narrowing step based on the reception energy of each resource output from the energy measuring device 124. The scheduler 114 randomly selects any one of the candidate resources narrowed down in the selection window. The scheduler 114 also determines a Modulation and Coding Scheme (MCS), the number of repetitions, etc. The scheduler 114 outputs information about the selected resource, the MCS, the number of repetitions, etc. to the control signal generator 115 and the data generator 116 as control information.

Note that one subframe is composed of 14 symbols in 4G, and one slot is composed of 14 symbols in 5G. In the resource pool k, one resource unit is one subframe in 4G, and one resource unit is one slot in 5G. Hereinafter, one resource unit may be described as a slot.

Figure 9A:
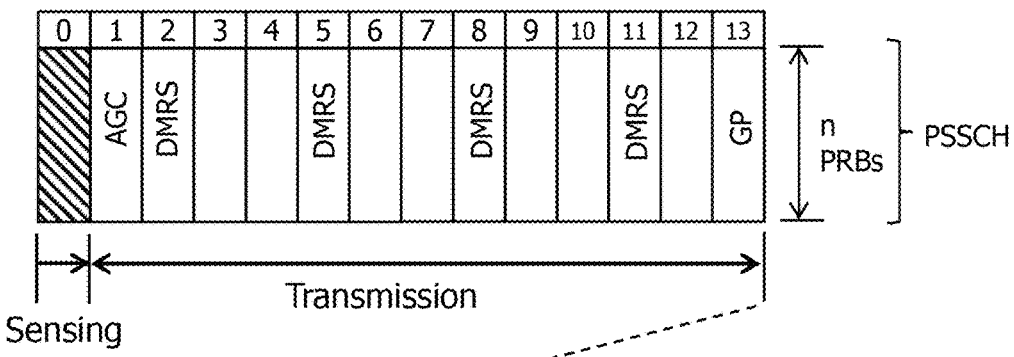
FIGS. 9A to 9D illustrate an example of symbol-level sensing.
Figure 9B:
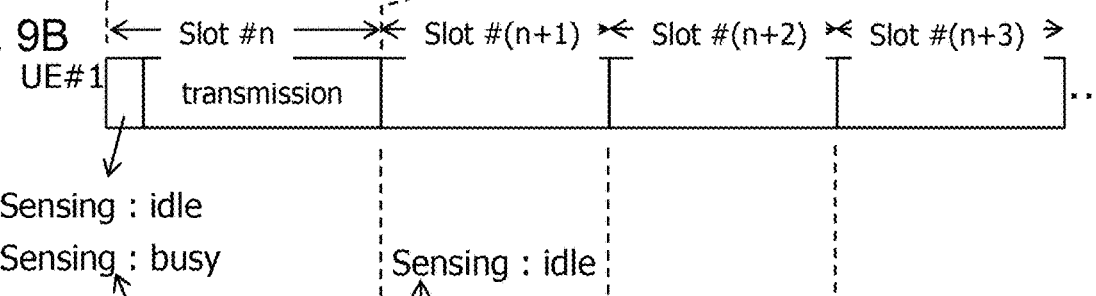

In the resource pool (k−1), for example, sensing is performed on a symbol basis. While details will be described below, for example, the scheduler 114 performs sensing at the "0th" symbol as illustrated in FIG. 9A or performs sensing using three symbols from the "0th" to "2nd" symbols as illustrated in FIG. 9D. In this case, the scheduler 114 determines whether the slot including the measured symbol can be used, based on the symbol-based reception energy measurement result output from the energy measuring device 124. For example, when the reception energy measurement result is equal to or greater than a threshold, the scheduler 114 determines "busy" and defers the transmission by its own terminal. In contrast, when the reception energy measurement result is lower than the threshold, the scheduler 114 determines "idle" and determines that the slot can be used. When determining that the slot can be used, the scheduler 114 determines the slot as information about the resource. The scheduler 114 also determines the MCS, the number of repetitions, etc. The scheduler 114 outputs these items of information to the control signal generator 115 as control information.

The control signal generator 115 generates a control signal by performing encoding processing and modulation processing on the control information. The control signal generator 115 outputs the generated control signal to the RF transmitter 117.

The data generator (or data generation unit) 116 generates data to be transmitted by the terminal 100. In this step, the data generator 116 determines QoS based on the parameters of the generated data. Examples of such parameters include communication delay, communication reliability, and priority of the data.

For example, the data generator 116 may determine the delay and reliability based on a use case (or a scenario) in which the data is used. Examples of the use case include a case in which a vehicle equipped with the terminal 100 performs vehicle platooning, automatic driving (advanced driving), extended sensors, remote driving, or the like. Alternatively, the data generator 116 may determine the delay and reliability based on whether the vehicle equipped with the terminal 100 performs semi-automatic driving or fully automatic driving. In addition, the data generator 116 may determine the data priority based on the type of data, for example, whether or not the data is urgent data.

In this way, the data generator 116 determines the delay and reliability based on the use case or the like and determines the priority based on the type of data, for example. The data generator 116 uses the delay, the reliability, and all or part of the priority to determine QoS of the data. The data generator 116 outputs the determined QoS to the scheduler 114. Further, the data generator 116 receives MCS from the scheduler 114, performs encoding processing, modulation processing, etc. on the generated data in accordance with the MCS, and generates a transmission signal. The data generator 116 outputs the transmission signal to the RF transmitter 117.

The RF transmitter 117 performs D/A conversion processing, frequency conversion processing, etc. on the control signal and the transmission signal to convert these signals into a sidelink signal of the radio band. The RF transmitter 117 transmits the sidelink signal to another terminal via the transmission antenna 118. In this step, the RF transmitter 117 transmits the sidelink signal in accordance with the information about the resource included in the control signal. This enables the control signal to be transmitted by using the PSCCH and the data to be transmitted by using the PSSCH. The RF transmitter 117 is also a transmission unit that transmits the control signal and the data to another terminal, for example.

The transmission antenna 118 transmits a sidelink signal to another terminal.

The reception antenna 120 receives a sidelink signal transmitted from another terminal and outputs the received sidelink signal to the RF receiver 121.

The RF receiver 121 performs frequency conversion processing, A/D conversion processing, etc. on the sidelink signal to convert the sidelink signal into a reception signal of the base band. The RF receiver 121 outputs the reception signal to the control signal detector 122 and the data detector 123.

The control signal detector 122 extracts the reception signal received by using the PSCCH as a control signal, performs demodulation processing and decoding processing on the extracted control signal, and reproduces (or extracts) the control information. The control signal detector 122 outputs the reproduced control information to the data detector 123.

The data detector 123 senses the reception signal received by using the PSSCH as a data signal based on the control information. The data detector 123 outputs the sensed data signal to the energy measuring device 124. The data detector 123 may perform demodulation processing, decoding processing, etc. on the sensed data signal to reproduce the data and output the reproduced data to an application processing unit or the like.

The energy measuring device 124 measures the reception energy of the sensed data signal.

Figure 4:
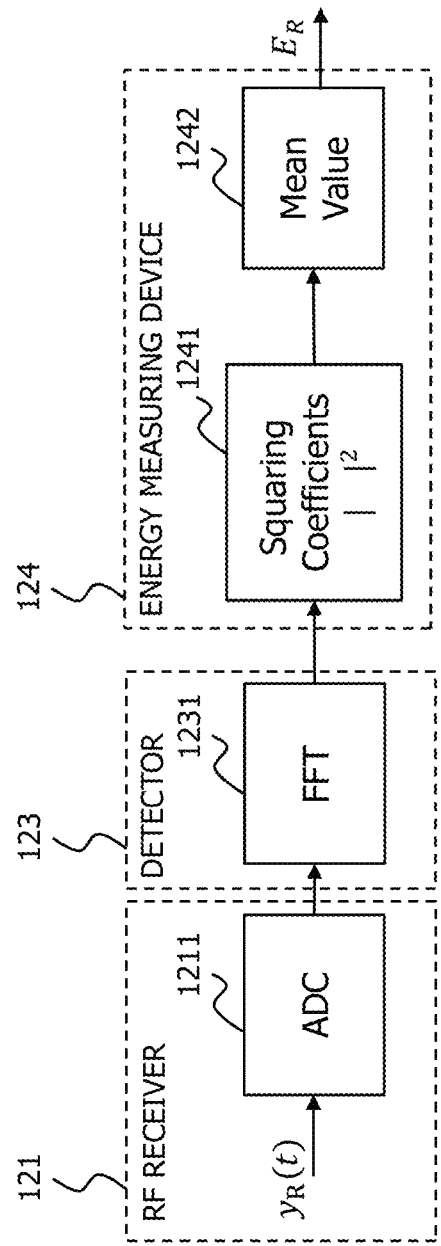
FIG. 4 illustrates a configuration example of an energy measuring device.

FIG. 4 illustrates a configuration example of the energy measuring device 124. A reception signal $y_R(t)$ is converted into a digital signal by an Analogue-to-Digital Converter (ADC) 1211 of the RF receiver 121 and is converted from the signal in the time domain to a signal in the frequency domain by a Fast Fourier Transform (FFT) 1231 of the data detector 123.

The energy measuring device 124 includes squaring coefficients 1241 and mean value 1242. The squaring coefficients 1241 calculates, for example, a square of the reception signal $y_R(t)$ in the frequency domain to obtain reception energy of the reception signal $y_R(t)$. The mean value 1242 calculates an average value ER of the reception energy. The energy measuring device 124 outputs the average reception energy ER to the scheduler 114 as a reception energy measurement result. As described above, the scheduler 114 compares the reception energy measurement result with a threshold to determine "busy" or "idle".

<3. Configuration Example of Base Station Apparatus>

Figure 3:
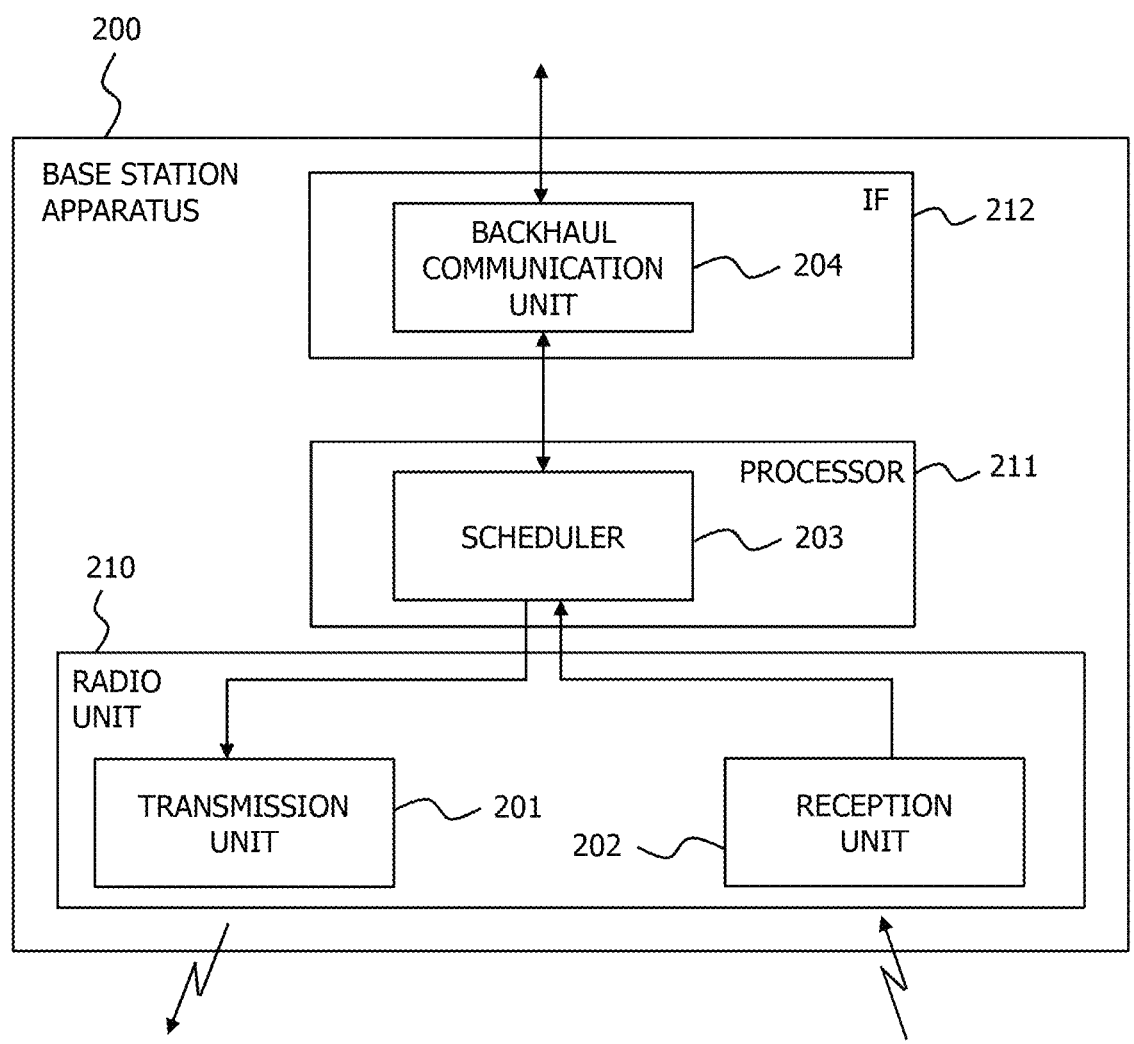
FIG. 3 illustrates a configuration example of a base station.

FIG. 3 illustrates a configuration example of the base station 200.

The base station 200 includes a radio unit 210, a processor 211, and an Interface (IF).

The radio unit 210 includes a transmission unit 201 and a reception unit 202. The transmission unit 201 performs encoding processing, modulation processing, frequency conversion processing, etc. on resource information output from a scheduler 203 to convert the resource information into a cellular signal. The transmission unit 201 transmits the cellular signal to the terminal 100. The reception unit 202 receives the cellular signal transmitted from the terminal 100, performs frequency conversion processing, demodulation processing, decoding processing, etc. on the received cellular signal, and reproduces the information transmitted from the terminal 100. The reception unit 202 outputs the reproduced information to the scheduler 203.

The processor 211 includes the scheduler 203. The scheduler 203 performs scheduling of the wireless communication for each terminal 100 within the coverage range of the base station 200. In the first embodiment, the scheduler 203 generates resource information and transmits the generated resource information to the terminal 100-1 via the transmission unit 201.

The processor 211 may be, for example, a Central Processing Unit (CPU), a Micro Processing Unit (MPU), a Digital Signal Processor (DSP), or a Field Programmable Gate Array (FPGA).

The IF 212 includes a backhaul communication unit 204. The backhaul communication unit 204 transmits information output from the scheduler 203 to a server device connected via a wired network and other base stations and outputs information received from a server device and other base stations to the scheduler 203.

<4. Resource Pool>

As described above, in the first embodiment, a plurality of resource pools k and k−1 are used as illustrated in FIG. 5. As illustrates in FIG. 6, the resource pool k or k−1 can be selected based on QoS of data.

FIG. 6 illustrates an example of the selection criteria table 113-c.

As illustrated in FIG. 6, in the first embodiment, QoS represents, for example, transmission delay (latency) and communication reliability.

In the example illustrated in FIG. 6, "QoS0" represents QoS that requests a delay of 3 ms or less and reliability of $10^{-5}$. A delay of "3 ms" represents, for example, that an allowable transmission delay is 3 ms or less. Reliability of "10-5" represents, for example, a degree of reliability such that, when the amount of transmission packet data is "100,000", the terminal on the reception side can receive "99,999" transmission packets.

"QoS1" represents QoS that requests a delay of 10 ms or less and reliability of 104. That is, an allowable transmission delay is 10 ms or less, and a degree of reliability is such that, when the amount of transmission packet data is "10,000", the terminal on the reception side can receive "9,999" transmission packets.

When QoS is "QoS0", the terminal 100 can use the resource pool (k−1) with a higher usage ranking than the resource pool k in accordance with the selection criteria table 113-c. This is because, for example, "QoS0" represents the strictest conditions (low delay and high reliability) in the QoS levels illustrated in FIG. 6, and the use of the resource pool (k−1) in which symbol-level sensing is performed enables data transmission that satisfies such strict conditions. That is, the terminal 100 can perform communication with low delay and high reliability by using the resource pool (k−1).

When QoS is "QoS1", the terminal 100 can use the resource pool k with a higher usage ranking than the resource pool (k−1) in accordance with the selection criteria. This is because, for example, "QoS1" is a QoS level that needs normal delay and reliability, and the use of the resource pool k in which slot-level sensing is performed is sufficient to satisfy such a level of QoS.

However, as illustrated in FIG. 6, even when QoS is "QoS0", the resource pool k can be used, and even when QoS is "QoS1", the resource pool (k−1) can be used. For example, if only the resource pool (k−1) is used for all the cases of "QoS0", While the resources of the resource pool (k−1) are used by many terminals 100 for data transmission, the resources of the resource pool k are hardly used. Such a situation may occur. Thus, for example, to prevent deterioration of resource utilization efficiency, another resource pool can be utilized.

In the examples illustrated in FIGS. 5 and 6, only one resource pool (k−1) is illustrates as the resource pool in which symbol-level sensing is performed. In the first embodiment, symbol-level sensing may be performed in a plurality of resource pools (k−1), (k−2), and so on. In this case, any one of the resource pools (k−1), (k−2), . . . , in which symbol-level sensing is performed, may serve as "Priority 1". Alternatively, the resource pools (k−1), (k−2), . . . , in which symbol-level sensing is performed, may be allocated in accordance with the type of data (whether or not the data is emergency data) to be transmitted or the type of service. For example, in a case of "emergency data" with "QoS=0", the resource pool (k−1) is selected, and in a case of "normal data" with "QoS=0" and for "remote operation", the resource pool (k−2) is selected.

In addition, FIG. 6 illustrates the example with two types of QoS, which are "QoS0" and "QoS1". For example, three or more types of QoS, such as "QoS3", "QoS4", . . . , may also be used. The QoS may be allocated in accordance with the magnitude of the delay and the degree of the reliability.

Further, the magnitude of the delay and the degree of the reliability of each QoS illustrated in FIG. 6 are also examples. For example, the delay may be 2 ms and the reliability may be 10-5 for "QoS0".

<5. Usage Examples of Resource Pools and Specific Example of Symbol-Level Sensing>

FIGS. 7 to 11 illustrate usage examples of the resource pools. Specific examples of symbol-level sensing will be described by referring to these usage examples.

In these usage examples, the terminal 100-1 (UE #1) transmits "QoS0" data, and the terminal 100-2 (UE #2) transmits "QoS1" data. The delay and reliability of "QoS0" and "QoS1" are assumed to be the same as those illustrated in FIG. 6. In FIGS. 7, 8, 10, and 11, the horizontal axis represents time, and the vertical axis represents frequency.

As illustrated in FIG. 7, the terminal 100-2 generates "QoS1" data and performs resource selection at the timing of the second slot from the beginning (S10). In this case, since QoS of the data is "QoS1", the terminal 100-2 selects the resource pool k in accordance with the selection criteria table 113-c. The terminal 100-2 then sets a selection window in the resource pool k and performs the resource exclusion step and the resource narrowing step within the range of the selection window.

Next, as illustrated in FIG. 8, the terminal 100-1 generates "QoS0" data and performs resource selection at the timing of the fourth slot from the beginning (S11). In this case, since QoS of the data is "QoS0", the terminal 100-1 selects the resource pool (k−1) in accordance with the selection criteria table 113-c.

The terminal 100-1 performs symbol-level sensing in the resource pool (k−1) at the time of the fifth slot (S12).

FIG. 9A illustrates an example of symbol-level sensing performed by the terminal 100-1. In FIG. 9A, an example of a PSSCH of the resource pool (k−1) is illustrated. A PSSCH is allocated to a different frequency band of the same slot.

FIG. 9A illustrates an example in which the leading "0" symbol is used for sensing. For example, the terminal 100-1 performs carrier sense on the leading "0" symbol before data transmission. When the reception energy of a signal transmitted from another terminal is equal to or greater than the threshold, the terminal 100-1 determines that the resource in the resource pool (k−1) that has been sensed is "busy". In this case, the terminal 100-1 postpones (defers) its own data transmission.

In the example in FIG. 9A, since the reception energy is lower than the threshold, the terminal 100-1 determines "idle" and starts the transmission from the "1" symbol. The example illustrated in FIG. 9A includes a symbol in which Automatic Gain Control (AGC) is performed and a symbol used for transmitting a Demodulation Reference Signal (DMRS), and blank symbols other than the above are used for data transmission. Namely, in the example in FIG. 9A, the terminal 100-1 uses the "3" symbol, the "4" symbol, the "6" symbol, and the like to transmit the "QoS0" data.

Figure 9C:
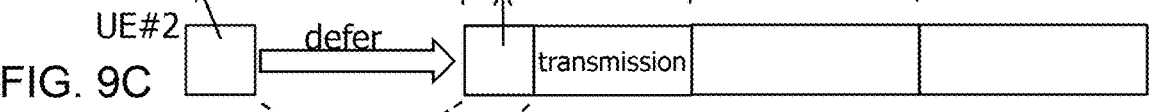
Figure 9D:
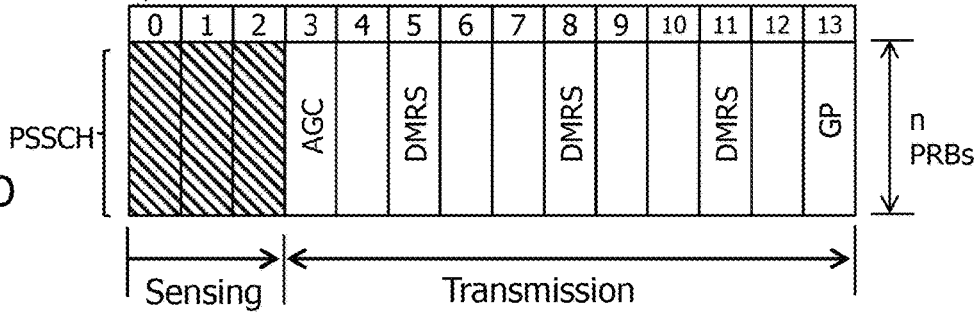

FIGS. 9C and 9D illustrate examples in which the terminal 100-2 performs sensing on the same frequency band (the resource pool (k−1)) at the same timing as the terminal 100-1. In this case, the terminal 100-2 performs carrier sense by using the first three symbols, namely, from the "0" to "2" symbols. The terminal 100-2 also performs symbol-level sensing when using the resource pool (k−1). However, in the examples in FIGS. 9C and 9D, the terminal 100-2 performs sensing by using three symbols.

As illustrated in FIGS. 9A and 9D, while the number of symbols used by the terminal 100-1 for sensing is "1", the number of symbols used by the terminal 100-2 for sensing is "3". As described above, the number of symbols used for sensing varies even for the same resource pool (k−1). This is because QoS of the data transmitted by the terminal 100-1 and QoS of the data transmitted by the terminal 100-2 are different. That is, since the terminal 100-1 transmits the "QoS0" data, low delay and high reliability are needed. Thus, the terminal 100-1 performs sensing by using the first one symbol. In contrast, since the terminal 100-2 transmits the "QoS1" data, normal delay and normal reliability are needed. Thus, the terminal 100-2 uses more symbols than in the case of transmission of the "QoS0" data to perform sensing. That is, in the example of FIG. 9D, the terminal 100-2 uses three symbols to perform sensing.

Therefore, for example, the higher the QoS level is, the smaller the number of symbols used for sensing may be, and the lower the QoS level is, the larger the number of symbols used for sensing may be. The number of symbols (or the number of resources used for sensing on a symbol basis) differs depending on the QoS level.

In other words, for example, when QoS is equal to or greater than a first threshold, the number of symbols used for sensing is equal to or less than a second threshold, and when QoS is lower than the first threshold, the number of symbols used for sensing is more than the second threshold.

For example, when transmitting "QoS" data, the terminal 100-1 may set no sensing symbol. Further, when transmitting "QoS1" data, the terminal 100-2 may set two symbols (two symbols, which are the "0" symbol and the "1" symbol) as sensing symbols. Any number of symbols may be set to be used for sensing as long as the number of symbols is smaller for "QoS0" than for "QoS1".

In the example in FIG. 9C, as a result of carrier sense performed by the terminal 100-2 for the sensing period from the "0" symbol to the "2" symbol, the reception energy of the signal transmitted from the terminal 100-1 has been sensed to be equal to or greater than the threshold. Thus, the terminal 100-2 determines "busy" and defers its own transmission for one slot. The terminal 100-2 then performs carrier sense on the same frequency band (the frequency band of the resource pool (k−1)) in the (n+1)th slot next and obtains the result that the reception energy of the signal transmitted from another terminal 100-1 is lower than the threshold. Thus, the terminal 100-2 transmits the "QoS1" data by using the "3rd" symbol from the (n+1)th slot onward.

In the example illustrated in FIG. 8, first, the terminal 100-2 performs sensing (S10), and subsequently, the terminal 100-1 performs sensing (S11). As a result of performing carrier sense on the resource pool (k−1), the terminal 100-1 obtains the result "idle". Thus, the terminal 100-1 transmits "QoS0" data by using the resource in the resource pool (k−1) (S12). Hereinafter, this example will be described.

As illustrates in FIG. 10, next, the terminal 100-2 repeats the resource exclusion step n (n is an integer of 2 or more) times in the selection window of the resource pool k, and after n times of repetitions, remaining candidate resources are less than 20% of all the resources within the range of the selection window. Thus, the terminal 100-2 switches the resource pool from the resource pool k to the resource pool (k−1) and performs symbol-level sensing in the resource pool (k−1) (S13).

The terminal 100-2 senses "idle", as a result of the carrier sense, and thus transmits "QoS1" data by using the resource in the resource pool (k−1) (S14).

Next, as illustrated in FIG. 11, the terminal 100-2 selects the resource pool k in accordance with the selection criteria table 113-*c* to transmits "QoS1" data as the next data. The terminal 100-2 then performs the resource exclusion step in the selection window of the resource pool k, selects one resource from the remaining candidate resources, and transmits the "QoS1" data (S15).

6. Operation Examples

Next, operation examples will be described. Firstly, an example of a sequence performed by the base station 200 and the terminals 100 will be described, and secondly, an example of an operation of the terminal 100 will be described.

<6.1 Example of Sequence Performed by Base Station Apparatus and Terminal Apparatuses>

Figure 12:
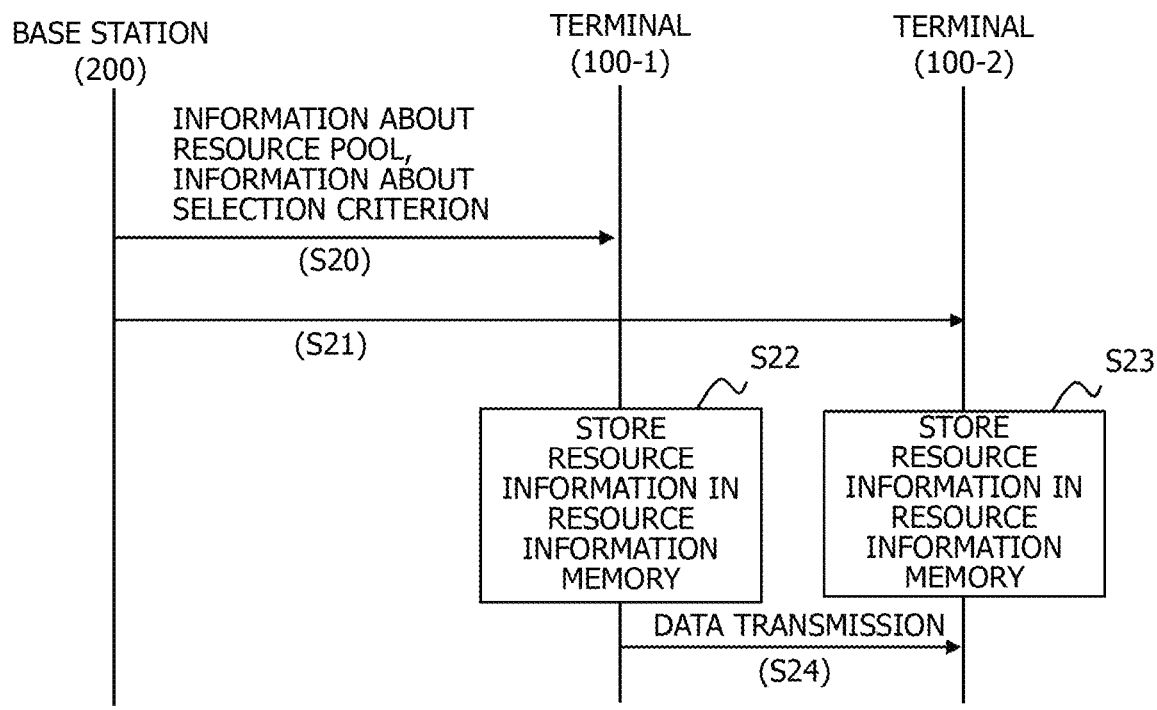
FIG. 12 is a sequence diagram illustrating an operation example of a base station and terminals.

FIG. 12 illustrates an example of a sequence performed by the base station 200 and the terminals 100-1 and 100-2. It is assumed that the terminals 100-1 and 100-2 are within the coverage range of the base station 200 and in an RRC-connected state with the base station 200.

The base station 200 transmits resource information to the terminals 100-1 and 100-2 (S20, S21). For example, the scheduler 203 or the transmission unit 201 may transmit the resource information to the terminals 100-1 and 100-2 using the RRC protocol. For example, the scheduler 203 or the transmission unit 201 may be a transmission unit that transmits the resource information.

Next, the terminals 100-1 and 100-2 store the received resource information in the resource information memory 113 (S22, S23). For example, the resource information is received by the RF receiver 111 of each of the terminals 100-1 and 100-2, reproduced by the channel demodulator 112, and stored in the resource information memory 113 by the channel demodulator 112. The RF receiver 111 is also a reception unit that receives the resource information, for example. As illustrated in FIG. 2, information about the resource pool (k−1) 113-*a*, information about the resource pool k 113-*b*, and the selection criteria table 113-*c* are stored in the resource information memory 113.

Returning to FIG. 12, next, the terminals 100-1 and 100-2 transmit and receive data via V2X communication (S24) while being in the coverage range of the base station 200 and being in an RRC idle state or while being outside the coverage range of the base station 200.

By performing the operation example described above, for example, the base station 200 can determine (or designate) the selection criterion and the resource pool, and the terminal 100 can perform V2X communication by using the selection criterion and resource pool determined by the base station 200.

Next, an example of an operation up to data transmission via V2X communication (S24) after the terminals 100-1 and 100-2 store the resource pool information, etc. in the resource information memory 113 (S22) will be described.

<6.2 Operation Example of Terminal Apparatus>

Figure 13:
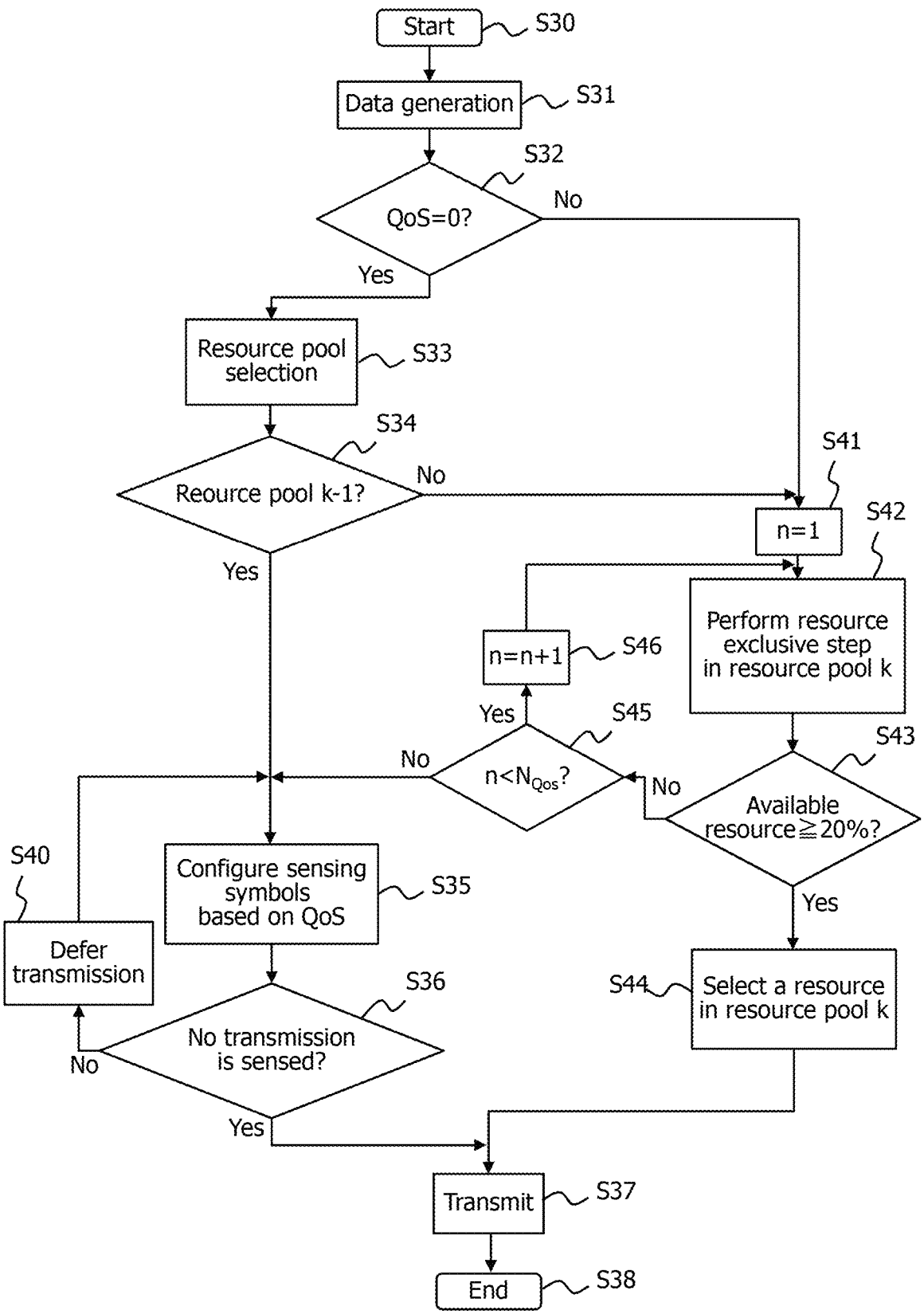
FIG. 13 is a flowchart illustrating an operation example of a terminal.

FIG. 13 is a flowchart illustrating an operation example of the terminal 100-1. Hereinafter, the terminal 100-1 may be referred to as the terminal 100.

The terminal 100 starts processing (S30) and generates data (S31). For example, the data generator 116 generates the data.

Next, the terminal 100 determines whether QoS=0 (S32). For example, the terminal 100 performs the following processing. That is, the data generator 116 determines QoS of the data based on the delay, the reliability, and all or part of the priority of the generated data and outputs the QoS to the scheduler 114. The scheduler 114 determines whether the QoS received from the data generator 116 is "0".

When the QoS=0 (Yes in S32), the terminal 100 selects a resource pool (S33). For example, when the QoS=0, the scheduler 114 selects a resource pool in accordance with the selection criteria of the selection criteria table 113-c. In the example in FIG. 6, when the QoS=0, the scheduler 114 selects the resource pool (k−1), which has the highest usage ranking.

However, when certain conditions are satisfied, the scheduler 114 may select the resource pool k, which has the second highest usage ranking. An example of the certain conditions includes a case where many remaining or narrowed resources with good quality are within the range of the selection window of the resource pool k (for example, the remaining resources are X % or more, the energy measured for the narrowed resources is smaller than a threshold, etc.). In such a case, for example, the scheduler 114 is likely to select a resource within the range of 1 to 3 ms from the time of resource selection in the selection window. This is because, if the scheduler 114 selects a resource within the range of 1 to 3 ms, it is possible to satisfy the delay and reliability needed when QoS=0.

When the terminal 100 selects the resource pool (k−1) (Yes, in S34), the terminal 100 sets a symbol to be sensed based on the QoS (S35). For example, when the QoS=0, the scheduler 114 may set the sensing symbol to the "0" symbol or may set no sensing symbol. Since information about a symbol to be set as the sensing symbol in accordance with the QoS is stored, for example, in the resource information memory 113, the scheduler 114 may read the information and set the sensing symbol. For example, such setting information may be transmitted from the base station 200 and stored in the resource information memory 113, as with the resource information.

Next, the terminal 100 determines whether no transmission from another terminal is sensed as a result of the sensing (S36). For example, the scheduler 114 makes this determination by obtaining, from the energy measuring device 124, an average reception energy ER of a reception signal $y_R(t)$ received using the sensing symbol of the resource pool (k−1) and determining whether the average reception energy ER is smaller than a threshold.

If no transmission from another terminal is sensed (Yes in S36), the terminal 100 transmits the data by using a resource in the resource pool (k−1), which has been sensed (S37). For example, the terminal 100 performs the following processing.

That is, when the average reception energy ER is smaller than the threshold, the scheduler 114 determines that the resource in the resource pool (k−1) is in an "idle" state. The scheduler 114 then outputs the resource allocation information illustrated in FIG. 9A to the control signal generator 115. The control signal generator 115 generates a control signal including the resource allocation information and outputs the resource allocation information to the RF transmitter 117. The RF transmitter 117 transmits the control signal by using the PSCCH of the resource pool (k−1) and the data by using the PSSCH of the resource pool (k−1) to another terminal (for example, the terminal 100-2).

Returning to FIG. 13, after transmitting the data (S37), the terminal 100 ends the series of processes (S38).

In contrast, if transmission from another terminal is sensed as a result of the sensing (No in S36), the terminal 100 defers its own transmission (S40). For example, the terminal 100 performs the following processing.

That is, when the average reception energy ER is equal to or greater than the threshold, the scheduler 114 determines that the resource pool (k−1) is in a "busy" state. Consequently, the scheduler 114 outputs no resource allocation information to the control signal generator 115 and controls the data generator 116 to defer the data output to the RF transmitter 117 for a period of one slot.

The terminal 100 then repeats the processing of S35 onward in the next slot.

If the resource pool (k−1) is not selected (No in S34), the terminal 100 sets "1" to n (S41). For example, n represents the number of repetitions of the resource exclusion step.

"If the resource pool (k−1) is not selected" indicates, for example, "if the resource pool k is selected". Sensing on a slot basis is performed in the resource pool k.

Next, the terminal 100 sets the selection window and the sensing window in the resource pool k and performs the resource exclusion step and the resource narrowing step (S42).

Next, the terminal 100 determines whether the candidate resources remain 20% or more of all the resources in the selection window as a result of the resource exclusion step, (S43). If the candidate resources remain 20% or more (Yes in S43), the terminal 100 randomly selects one resource from the candidate resources (S44). Next, the terminal 100 transmits the data by using the selected resource (S37). The terminal 100 then ends the series of processes (S38).

If the candidate resources remain less than 20% as a result of the resource exclusion step (No in S43), the terminal 100 determines whether the number of repetitions n is smaller than a limit count $N_{QoS}$ (S45).

When the candidate resources are less than 20% as a result of the resource exclusion step, the terminal 100 increases the threshold for the reception energy (or relaxes the conditions) and repeats the resource exclusion step. Here, a limit is given to the number of repetitions n, and the terminal 100 determines whether the number of repetitions n has reached the limit count $N_{QoS}$. For example, the scheduler 114 counts the number of repetitions n of the resource exclusion step and determines whether the number of repetitions n counted is less than the limit count $N_{QoS}$.

When the number of repetitions n is less than the limit count $N_{QoS}$ (Yes in S45), the terminal 100 increments the number of repetitions n (S46), increases the threshold for the reception energy, and performs the resource exclusion step again (S42). For example, when the number of repetitions n is less than the limit count $N_{QoS}$, the scheduler 114 increments the number of repetitions n, increases the threshold for the reception energy, and performs the resource exclusion step again.

The terminal 100 repeats the resource exclusion step (a loop of S42, S43, S45, and S46), and when the number of repetitions n reaches the limit count $N_{QoS}$ (No in S45), the terminal 100 switches the resource pool from the resource pool k to the resource pool (k−1) and preforms the processing of S35 onward. This process corresponds to, for example, the process of S13 in FIG. 10. For example, when the number of repetitions n counted reaches the limit count $N_{QoS}$, the scheduler 114 switches the resource pool from the resource pool k to the resource pool (k−1) and performs symbol-level sensing in the resource pool (k−1).

The terminal 100 switches the resource pool from the resource pool k to the resource pool (k−1) since, when the number of repetitions n reaches the limit count $N_{QoS}$, even if the resource exclusion step is further performed, the candidate resources are highly unlikely to be 20% or more. In a case where many terminals use the resource pool k, although the terminal 100 has selected the resource pool k first, the terminal 100 uses the resource pool (k−1) instead. Subsequently, the terminal 100 performs the processing of S35 onward.

If the QoS is not zero (No in S32), the terminal 100 selects the resource pool k in accordance with the selection criteria table 113-c. The terminal 100 then perform the processing of S41 onward. In this case, too, when the candidate resources are less than 20% (No in S43) and when the number of repetitions n of the resource exclusion step reaches the limit count $N_{QoS}$ (No in S45), the terminal 100 switches to the resource pool (k−1) and performs the resource selection (S35 to S38).

Figure 14:
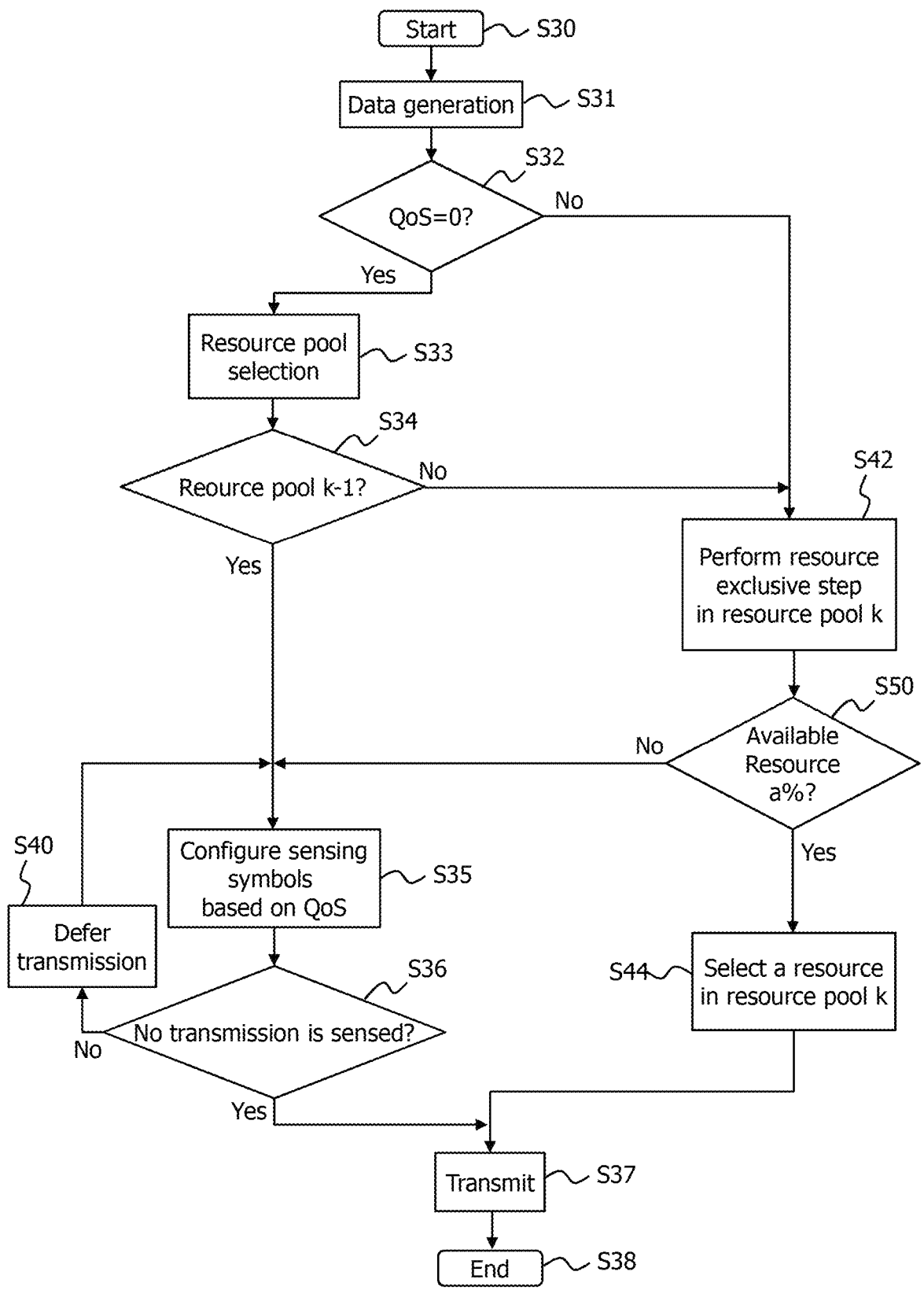
FIG. 14 is a flowchart illustrating an operation example of a terminal.

FIG. 14 is a flowchart illustrating another operation example of the terminal 100.

In FIG. 14, the terminal 100 performs the resource exclusion step in the resource pool k (S42), selects the resource in the resource pool k when the available resources are a % or more in the selection window (Yes in S50), selects a resource in the resource pool k (S44), and transmits the data by using the selected resource (S37).

Here, "a" is, for example, a numerical value that varies in accordance with the QoS of the data. For example, when the QoS=1, a=20, and when the QoS=2, a=10.

Even in a case where the resource pool k is used, when the QoS is the strictest (for example, the QoS=1) and when the candidate resources are less than 20%, the resource pool (k−1) is immediately used without repeatedly performing the resource exclusion step. In this way, data transmission that satisfies such a strict QoS can be performed. In contrast, when the QoS has milder conditions (for example, QoS=2) than the strictest QoS, the resource pool is not switched to the resource pool (k−1) when the candidate resources are less than 10%. Instead, the resource pool k is used. In this way, for example, data transmission that corresponds to such a mild QoS can be performed.

Next, another example according to the first embodiment will be described.

FIG. 15 illustrates another example of the selection criteria table 113-c.

The selection criteria table 113-c in FIG. 15 illustrates a case where the resource pool k and the resource pool (k−1) have the same usage ranking for "QoS0". For example, the scheduler 114 may select the resource pool k or the resource pool (k−1) when the QoS is "QoS0". While the terminal 100 may select the resource pool k, when the terminal 100 selects the resource pool (k−1), symbol-level sensing is performed. Thus, compared with the case where the resource pool k is always selected, since the terminal 100 may select the resource pool (k−1), the communication delay can be reduced, and the communication reliability can be improved.

In addition, according to the first embodiment, the resource information is transmitted from the base station 200 and received by the terminal 100, and the terminal 100 performs V2X communication by using the received resource information. For example, the resource information may be stored in the resource information memory 113 at the time of factory shipment. In this case, the terminal 100 can perform V2X communication with another terminal by using the resource information stored in the resource information memory 113 without receiving the resource information from the base station 200.

As described above, the selection criterion may be determined by the terminal 100 or by the base station 200 as described above in <6.1 Example of Sequence Performed by Base Station Apparatus and Terminal Apparatuses>, for example. In addition, even when the selection criterion is determined by the terminal 100, the selection criterion determined (or designated) by the base station 200 may be used by performing the above <6.1 Example of Sequence Performed by Base Station Apparatus and Terminal Apparatuses>, for example.

As described above, according to the first embodiment, the terminal 100 can select any one of the resource pool (k−1), in which symbol-level sensing is performed, and the resource pool k, in which slot-level sensing is performed, based on the QoS and the selection criterion of the data to be transmitted. Since the sensing is performed on a symbol basis in the resource pool (k−1), for example, when the resource pool (k−1) is selected, a communication delay requirement of 3 ms can be achieved. Thus, the terminal 100 according to the first embodiment can reduce the communication delay.

In addition, when the terminals 100 use only one of the resource pools, this resource pool will be used by many terminals 100. This may lead to deterioration of the communication reliability. However, according to the first embodiment, the terminal 100 can use any one of the resource pools. This allows the resource pools to be allocated to the individual terminals. For example, while one terminal uses the resource pool k, another terminal uses the resource pool (k−1). Thus, according to the first embodiment, compared with the case where only one of the resource pools is used, the probability that only one resource pool is used can be reduced. Therefore, according to the first embodiment, the communication reliability can be improved.

Further, when only one of the resource pools is used, as described above, the resource utilization efficiency may decrease. However, according to the first embodiment, since the terminal 100 can use any one of the resource pools, more resources are available, compared with the case where only one of the resource pools is used. Consequently, the resource utilization efficiency can also be improved.

OTHER EMBODIMENTS

Figure 16:
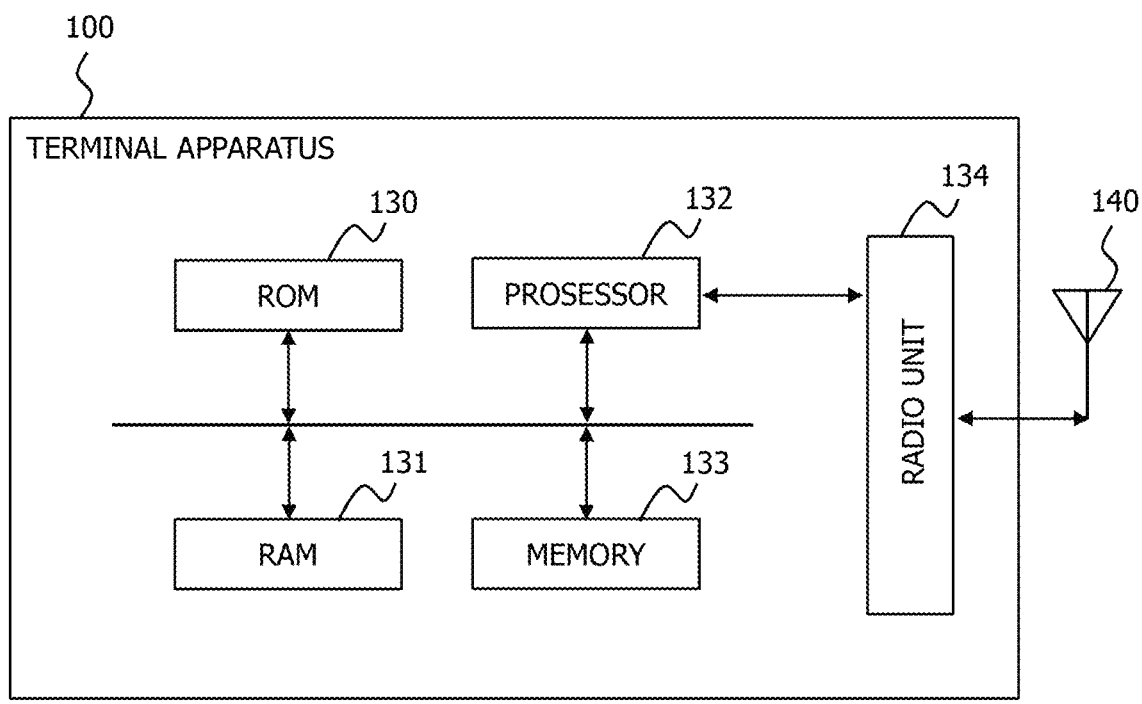
FIG. 16 illustrates an example of a hardware configuration of a terminal.
Figure 17:
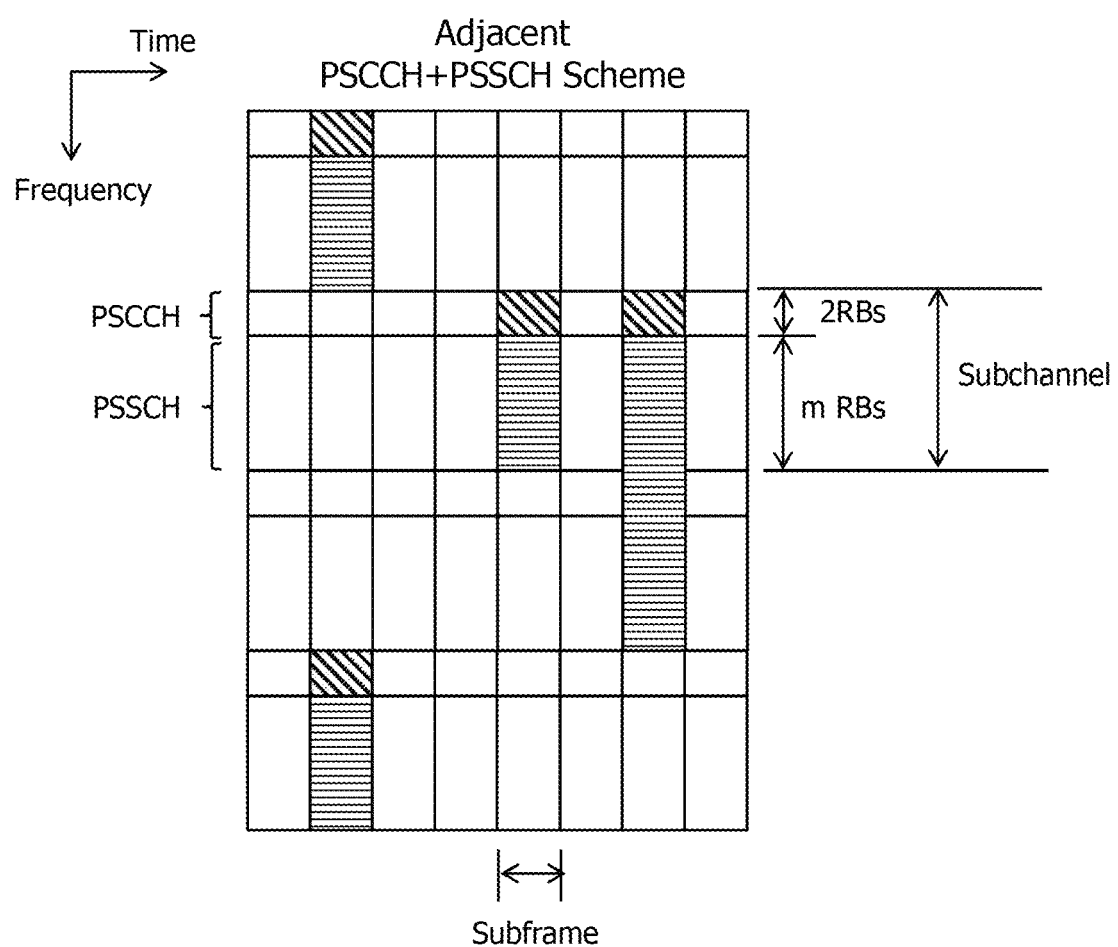
FIG. 17 illustrates an example of resource allocation of PSCCHs and PSSCHs.
Figure 18:
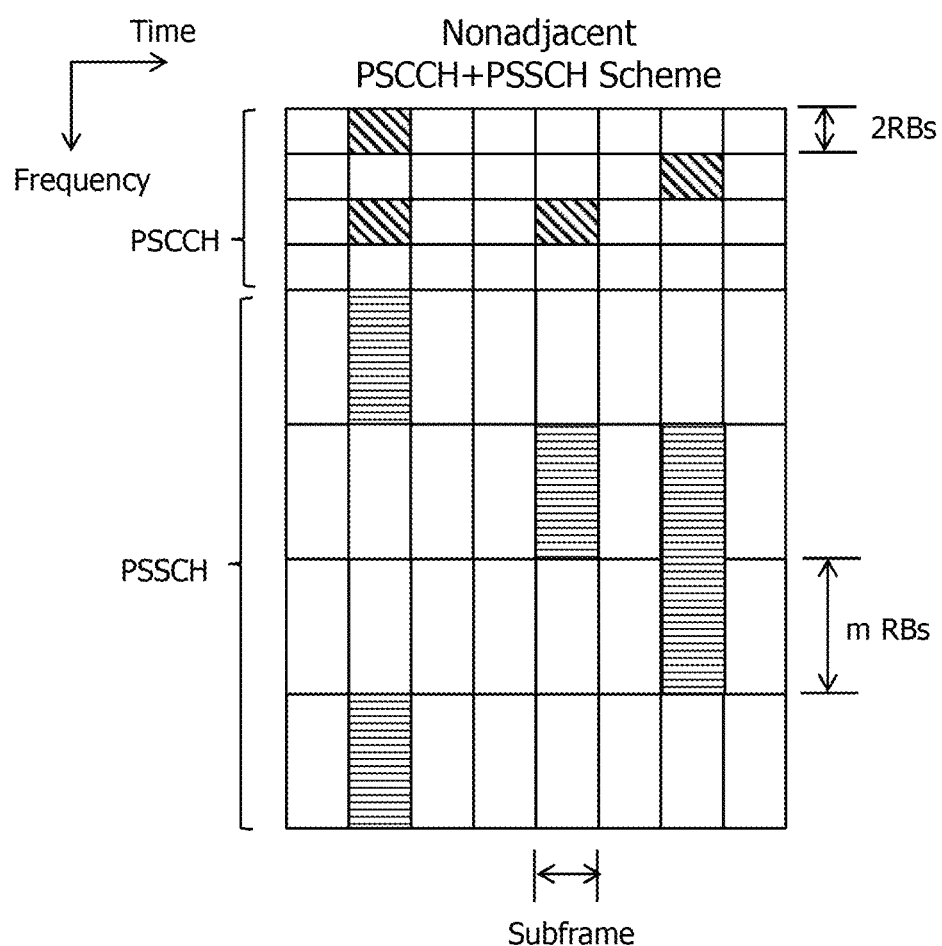
FIG. 18 illustrates an example of resource allocation of PSCCHs and PSSCHs.

FIG. 16 illustrates an example of a hardware configuration of the terminal 100.

The terminal 100 includes a Read Only (ROM) 130, a Random Access Memory (RAM) 131, a processor 132, a memory 133, a radio unit 134, and an antenna 140.

The processor 132 reads a program stored in the ROM 130, loads the program onto the RAM 131, and executes the loaded program to realize the functions of the data traffic processing unit 101, the channel encoder 102, the IFFT 103, and the CP addition unit 104. In addition, the processor 132 executes the program to realize the functions of the channel demodulator 112, the scheduler 114, the control signal generator 115, the data generator 116, the control signal detector 122, the data detector 123, and the energy measuring device 124. The processor 132 corresponds to, for example, the data traffic processing unit 101, the channel encoder 102, the IFFT 103, the CP addition unit 104, the channel demodulator 112, and the scheduler 114 in the first embodiment. In addition, the processor 132 corresponds to, for example, the control signal generator 115, the data generator 116, the control signal detector 122, the data detector 123 and the energy measuring device 124 in the first embodiment. Further, the memory 133 corresponds to, for example, the resource information memory 113 in the first embodiment.

In addition, the radio unit 134 corresponds to, for example, the RF transmitters 105 and 117 and the RF receivers 111 and 121 in the first embodiment. Further, the antenna 140 corresponds to, for example, the transmission antennas 106 and 118 and the reception antennas 110 and 120 in the first embodiment.

Communication delay can be reduced, and communication reliability can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10: communication system
100 (100-1 to 100-3): terminal apparatus (terminal)
100-*v*1 to 100-*v*3: vehicle
105, 117: RF transmitter
106, 118: transmission antenna
110, 120: reception antenna
111, 121: RF receiver
112: channel demodulator
113: resource information memory
113-*a*: information about the resource pool (k−1)
113-*b*: information about the resource pool k
113-*c*: selection criteria table
114: sidelink scheduler (scheduler)
115: sidelink control signal generator (control signal generator)
116: sidelink data generator (data generator)
122: sidelink control signal detector (control signal detector)
123: sidelink data detector (data detector)
124: energy measuring device
132: processor
200: base station apparatus (base station)
203: scheduler
211: processor

What is claimed is:

1. A communication apparatus that supports sidelink communication, the communication apparatus comprising:
a scheduler configured to:
select a first resource pool from a plurality of resource pools,
determine a first threshold based on information regarding sidelink communication, the first threshold is a threshold for a percentage of available resources in the selected first resource pool,
when the percentage of available resources are smaller than the first threshold, increase a second threshold for reception energy,
perform exclusion processing to exclude resources from the first resource pool, and
repeat the exclusion process until the percentage of available resources being equal to or higher than the first threshold; and
a transmitter configured to transmit control information and data by using a resource selected by the scheduler, wherein
the information regarding sidelink communication is a priority condition requested when the data is transmitted via sidelink communication.

2. The communication apparatus according to claim 1, wherein
the selection criterion includes usage ranking indicating that at least one resource pool of the plurality of resource pools is preferentially used per information regarding sidelink communication, and
the scheduler selects one of the resource pools based on the usage ranking and the information regarding sidelink communication.

3. The communication apparatus according to claim 1, wherein, even after the scheduler selects a resource pool having a first usage ranking from the plurality of resource pools, when the priority condition is not satisfied, the scheduler switches the resource pool to a resource pool having a second usage ranking.

4. The communication apparatus according to claim 1, further comprising a receiver configured to receive the selection criterion of the resource pool transmitted from a base station apparatus, wherein
the scheduler selects one of the resource pools based on the received selection criterion and the information regarding sidelink communication.

5. The communication apparatus according to claim 1, further comprising a resource information memory that stores the selection criterion of the resource pool, wherein
the scheduler selects one of the resource pools based on the selection criterion read from the resource information memory and the information regarding sidelink communication.

6. The communication apparatus according to claim 1, wherein the resource pool is a first resource pool in which resources are sensed in a first time unit or a second resource pool in which resources are sensed in a second time unit which is shorter than the first time unit.

7. The communication apparatus according to claim 6, wherein the first time unit is a slot unit or a subframe unit.

8. The communication apparatus according to claim 7, wherein the second time unit is a symbol unit.

9. The communication apparatus according to claim 7, wherein a number of resources used for sensing in the second time unit in the second resource pool depends on the information regarding sidelink communication.

10. The communication apparatus according to claim 7, wherein
the information regarding sidelink communication contains the priority condition which is requested when the data is transmitted via sidelink communication, and
when the priority condition is equal to or greater than a first threshold, the number of resources used for sensing in the second time unit is equal to or less than a second threshold, and when the priority condition is less than the first threshold, the number of resources used for sensing in the second time unit is greater than the second threshold.

11. The communication apparatus according to claim 1, wherein the priority condition is represented by communication delay and communication reliability.

12. The communication apparatus according to claim 1, further comprising a data generator configured to generate the data, wherein
the data generator determines the priority based on parameters of the data.

13. The communication apparatus according to claim 12, wherein the parameters include a use case in which the data is used and all or part of data priority.

14. The communication apparatus according to claim 1, wherein the communication apparatus autonomously selects a resource from the plurality of resource pools and transmits the data by using the selected resource.

15. The communication apparatus according to claim 1, wherein the communication apparatus transmits data by using sidelink communication in communication mode that determines a radio resource for transmitting the data using the sidelink communication by the communication apparatus.

16. The communication apparatus according to claim 1, wherein the first threshold is determined by priority of the data.

17. The communication apparatus according to claim 1, wherein the exclusion process is a process of excluding resources from the first resource pool according to the second threshold.

18. A base station apparatus that supports Device to Device communication, the base station apparatus comprising:
a scheduler configured to generate information regarding a selection criterion set for an individual one of a plurality of resource pools; and
a transmitter configured to:
select one of the resource pools based on the selection criterion and information regarding sidelink communication, when the percentage of available resources are smaller than a first threshold, the first threshold is a threshold for a percentage of available resources in the selected resource pool,
increase a second threshold for reception energy, perform exclusion processing to exclude resources from the selected resource pool, and
repeat the exclusion process until the percentage of available resources being equal to or higher than the first threshold, wherein
the information regarding sidelink communication is priority requested when the data is transmitted via sidelink communication.

19. A communication system that supports Device to Device communication, the communication system comprising:
a base station apparatus; and
a terminal apparatus, wherein
the base station apparatus includes:
a first scheduler that generates information regarding a selection criterion set for an individual one of a plurality of resource pools; and
a first transmitter configured to transmit the information regarding the selection criterion to the terminal apparatus;
the terminal apparatus includes:
a receiver configured to receive the information regarding the selection criterion;
a second scheduler that selects one of the resource pools based on the selection criterion and the information regarding sidelink communication when the percentage of available resources are smaller than a first threshold, the first threshold is a threshold for a percentage of available resources in the selected resource pool, to increase a second threshold for reception energy, to perform exclusion processing to exclude resources from the selected resource pool, and repeat the exclusion process until the percentage of available resources being equal to or higher than the first threshold; and
a transmitter configured to transmit data by using a resource included in the selected resource pool; and
the information regarding sidelink communication is priority requested when the data is transmitted via sidelink communication.

20. A communication system that supports sidelink communication, the communication system comprising:
a first terminal apparatus; and
a second terminal apparatus, wherein
the first terminal apparatus includes:
a scheduler that selects one of the resource pools based on a selection criterion set for an individual one of a plurality of resource pools and information regarding sidelink communication when the percentage of available resources are smaller than a first threshold, the first threshold is a threshold for a percentage of available resources in the selected first resource pool, to increase a second threshold for reception energy, to perform exclusion processing to exclude resources from the selected resource pool, and repeat the exclusion process until the percentage of available resources being equal to or higher than the first threshold; and
a transmitter configured to transmit data by using a resource included in the selected resource pool;
the second terminal includes a receiver configured to receive the data by using a resource included in the resource pool; and
the information regarding sidelink communication is priority requested when the data is transmitted via sidelink communication.

* * * * *